US011709812B2

(12) United States Patent
Wang et al.

(10) Patent No.: US 11,709,812 B2
(45) Date of Patent: Jul. 25, 2023

(54) TECHNIQUES FOR GENERATING AND PROCESSING HIERARCHICAL REPRESENTATIONS OF SPARSE MATRICES

(71) Applicant: NVIDIA CORPORATION, Santa Clara, CA (US)

(72) Inventors: Hanrui Wang, Cambridge, MA (US); James Michael O'Connor, Austin, TX (US); Donghyuk Lee, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 14 days.

(21) Appl. No.: 17/325,133

(22) Filed: May 19, 2021

(65) Prior Publication Data

US 2022/0374403 A1 Nov. 24, 2022

(51) Int. Cl.
*G06F 16/22* (2019.01)
*G06F 17/16* (2006.01)
*G06F 18/2134* (2023.01)

(52) U.S. Cl.
CPC ...... *G06F 16/2237* (2019.01); *G06F 16/2246* (2019.01); *G06F 16/2272* (2019.01); *G06F 17/16* (2013.01); *G06F 18/21345* (2023.01)

(58) Field of Classification Search
CPC ............. G06F 16/2237; G06F 16/2246; G06F 16/2272; G06F 16/16
See application file for complete search history.

(56) References Cited

U.S. PATENT DOCUMENTS

| | | | |
|---|---|---|---|
| 10,600,009 B1* | 3/2020 | Augustine | G06F 21/16 |
| 10,866,989 B1* | 12/2020 | Chandler | G06V 20/40 |
| 2013/0166188 A1* | 6/2013 | Zheng | G08G 1/0133 |
| | | | 701/117 |
| 2018/0117446 A1* | 5/2018 | Tran | A42B 3/0433 |
| 2018/0204111 A1* | 7/2018 | Zadeh | G06N 3/043 |

(Continued)

OTHER PUBLICATIONS

Zhang et al., "SpArch: Efficient Architecture for Sparse Matrix Multiplication", The 26th IEEE International Symposium an High-Performance Computer Architecture (HPCA 2020), arXiv:2002.08947v1 [cs AR] Feb. 20, 2020, 15 pages.

(Continued)

*Primary Examiner* — Eliyah S. Harper
(74) *Attorney, Agent, or Firm* — Artegis Law Group, LLP

(57) ABSTRACT

One embodiment sets forth a technique for generating a tree structure within a computer memory for storing sparse data. The technique includes dividing a matrix into a first plurality of equally sized regions. The technique also includes dividing at least one region in the first plurality of regions into a second plurality of regions, where the second plurality of regions includes a first region and one or more second regions that have a substantially equal number of nonzero matrix values and are formed within the first region. The technique further includes creating the tree structure within the computer memory by generating a first plurality of nodes representing the first plurality of regions, generating a second plurality of nodes representing the second plurality of regions, and grouping, under a first node representing the first region, one or more second nodes representing the one or more second regions.

20 Claims, 11 Drawing Sheets

(56) References Cited

U.S. PATENT DOCUMENTS

| | | | | |
|---|---|---|---|---|
| 2019/0036786 A1* | 1/2019 | Khojastepour | ......... | H04L 41/12 |
| 2019/0094981 A1* | 3/2019 | Bradski | ................ | H04N 13/344 |
| 2019/0138595 A1* | 5/2019 | Galitsky | ................ | G06N 3/006 |
| 2019/0302976 A1* | 10/2019 | Polson | .................. | G06F 3/0484 |
| 2019/0361917 A1* | 11/2019 | Tran | ........................ | G06Q 40/03 |
| 2019/0385711 A1* | 12/2019 | Shriberg | ................ | G16H 50/20 |
| 2020/0117690 A1* | 4/2020 | Tran | .................. | G06F 16/90332 |
| 2020/0286463 A1* | 9/2020 | Galitsky | .................. | G06F 16/35 |
| 2021/0210170 A1* | 7/2021 | Gardner | .................. | G06N 5/022 |
| 2021/0241353 A1* | 8/2021 | Sridhar | .............. | G06Q 30/0631 |
| 2021/0295822 A1* | 9/2021 | Tomkins | ............... | G06F 16/367 |

OTHER PUBLICATIONS

GB Combined Search Report and Abbreviated Examination Report for application No. 2205394.6 dated Sep. 26, 2022, 8 pages.

* cited by examiner

TECHNIQUES FOR GENERATING AND PROCESSING HIERARCHICAL REPRESENTATIONS OF SPARSE MATRICES

GOVERNMENT RIGHTS

This invention was made with US Government support under Agreement HR0011-18-3-0007 (SDH Symphony), awarded by DARPA. The US Government has certain rights in the invention.

BACKGROUND

Field of the Various Embodiments

Embodiments of the present disclosure relate generally to storing and accessing sparse data and, more specifically, to techniques for generating and processing hierarchical representations of sparse matrices.

Description of the Related Art

A sparse matrix is a special type of matrix where most of the matrix elements have values of zero. Sparse matrices are commonly used in various scientific and computational applications. For example, sparse matrices can be used to store and/or access databases, graphs, machine learning models, and/or other types of structures or data. In another example, products of sparse matrices can be used to solve partial differential equations related to engineering or mathematical modeling. In a third example, sparse matrices can be used to store and/or apply transformations to point clouds, images, meshes, and/or other two-dimensional (2D) or three-dimensional (3D) data.

Sparse matrices oftentimes are in a compressed format that omits the matrix elements having values of zero. This type of compressed format typically includes the nonzero matrix element values as well as metadata that indicates the coordinates of those nonzero matrix element values within the sparse matrix. One common sparse matrix format is Compressed Sparse Row (CSR), which represents a sparse matrix using three one-dimensional arrays. Within the CSR format, a first array stores the nonzero matrix element values in the sparse matrix (in the order of a row-by-row traversal of the sparse matrix), a second array stores the column indexes of the nonzero matrix element values in the sparse matrix, and a third array stores, for each row in the sparse matrix, the cumulative number of nonzero matrix element values up to (but not including) that row. Another common sparse matrix format is Compressed Sparse Column (CSC), which also represents a sparse matrix using three one-dimensional arrays. The CSC format is similar to CSR except that the first array stores nonzero matrix element values in the order of a column-by-column traversal, the second array stores row indexes of the nonzero matrix element values in the sparse matrix, and the third array stores, for each column in the index, the cumulative number of nonzero matrix element values up to (but not including) that column.

One drawback of the conventional compressed formats used for sparse matrices is that these compressed formats are not optimized for highly parallel processors, such as graphics processing units (GPUs). In this regard, to process a sparse matrix efficiently using a parallel processor, a compressed format should allow various matrix elements or various rectangular "tiles" that group the nonzero matrix element values together to be arbitrarily accessed, include a balanced number of nonzero matrix element values across tiles, structure tiles to be "compact" along various dimensions of the sparse matrix (e.g., to reduce the amount of data fetched from other matrices during matrix multiplication operations), and provide efficient storage of and access to the metadata that indicates the coordinates of the nonzero element values within the sparse matrix. However, the conventional compressed formats used for sparse matrices do not address all of these considerations. Consequently, using conventional compressed formats typically results in increased latencies and reduced processing efficiency when performing computations or other operations with sparse matrices.

For example, the CSR format describe above divides nonzero matrix element values into tiles that correspond to individual rows of a sparse matrix. The CSR format also includes metadata that specifies indexes for the nonzero matrix element values in a given row. However, the CSR format is not structured in a way that enables efficient column lookup operations or simplified load balancing across rows. The CSR format also is not compact along the horizontal dimensions of a sparse matrix because, in the CSR format, the nonzero matrix element values are organized along entire rows of the sparse matrix. Consequently, performing matrix multiplication computations or other operations in parallel across multiple processing elements within a parallel processor using sparse matrices stored in the CSR format can result in an uneven distribution of row-based workloads across the different processing elements, slow accesses of nonzero matrix element values along the columns of a sparse matrices, and/or an increase in the amount of data accessed from another matrix when multiplying the rows of a sparse matrix with the columns of the other matrix.

As the foregoing illustrates, what is needed in the art are more effective techniques for storing and processing sparse matrices in compressed formats.

SUMMARY

One embodiment sets forth a technique for generating a tree structure within a computer memory for storing sparse data. The technique includes dividing a matrix into a first plurality of equally sized regions. The technique also includes dividing at least one region in the first plurality of regions into a second plurality of regions, where the second plurality of regions includes a first region and one or more second regions that have a substantially equal number of nonzero matrix values and are formed within the first region. The technique further includes creating the tree structure within the computer memory by generating a first plurality of nodes representing the first plurality of regions, generating a second plurality of nodes representing the second plurality of regions, and grouping, under a first node representing the first region, one or more second nodes representing the one or more second regions.

One technical advantage of the disclosed techniques relative to the prior art is that regions of a sparse matrix having similar numbers of nonzero matrix element values can be distributed across multiple processing elements within a parallel processor when performing matrix multiplication operations or matrix operations to achieve more balanced work distributions across those processing elements. Another technical advantage of the disclosed techniques is that the amount of data accessed from another matrix when multiplying the regions of a sparse matrix containing nonzero matrix element values with regions of the other matrix is reduced. An additional technical advantage of the disclosed techniques is that a tree structure that does not include nodes representing empty regions of a sparse matrix can be traversed to access arbitrary regions, dimensions, or matrix elements of the sparse matrix more efficiently relative to prior art techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
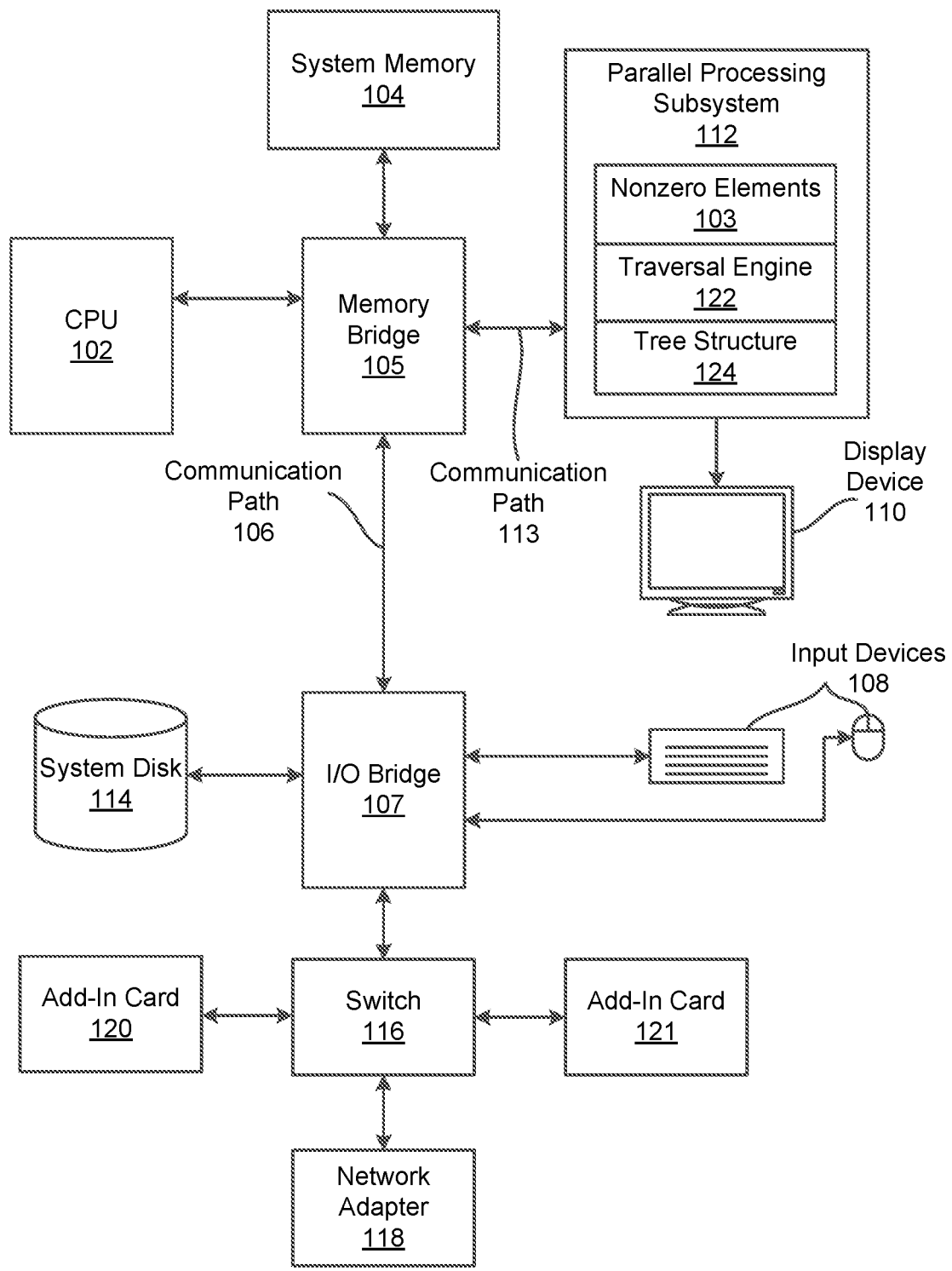
FIG. 1 illustrates a system configured to implement one or more aspects of various embodiments.

In the following description, numerous specific details are set forth to provide a more thorough understanding of the various embodiments. However, it will be apparent to one of skilled in the art that the inventive concepts may be practiced without one or more of these specific details.

General Overview

A sparse matrix is a special type of matrix where most of the matrix elements have values of zero. For example, a "user-item" sparse matrix could store clicks, views, purchases, and/or other interactions between users of a platform and items offered for sale on the platform. Each row of the matrix would represent a different user, and each item in the matrix would represent a different item. A given element represented by a specific row and a specific column in the matrix would store the number of interactions between a user corresponding to the row and an item corresponding to the column. Because the platform could have billions of customers and items, a very large number of elements in the matrix would have zero values (because users generally interact with a very small proportion of items offered by the platform).

Sparse matrices are commonly used in a number of applications. First, sparse matrices can be used to represent machine learning models and/or generate machine learning output. Continuing with the above example, the user-item sparse matrix could be converted into features and/or labels that are included in a training dataset for a machine learning model. During training of the machine learning model, the training dataset is used to update parameters of machine learning model, so that the machine learning model learns to predict interactions between the users and items based on attributes of the users and/or items. The trained machine learning model is then used to generate recommendations of items on the platform to users of the platform. In another example, a sparse matrix could be used to store connections and/or weights between neurons in a neural network or another type of machine learning model. Second, sparse matrices can be used in a finite element method (FEM) that produces numerical solutions to partial differential equations (PDEs) that simulate structural or fluid behavior, thermal transport, wave propagation, biological growth, electromagnetic potential, and/or other physical phenomena. Third, sparse matrices can be used to store and/or apply transformations to images, point clouds, meshes, voxels, and/or other two-dimensional (2D) or three-dimensional (3D) representations of objects or scenes. Fourth, sparse matrices can be used to store graphs of relationships or interactions between users in social networks or other online environments. These graphs can then be traversed and/or otherwise analyzed to process queries related to the users or interactions, recommend users as potential connections to one another, identify clusters or other groupings of users, and/or perform other tasks related to the users and the users' relationships or interactions.

Sparse matrices are commonly stored in compressed formats that omit all matrix elements that store zero values. These compressed formats include all nonzero elements in a given sparse matrix and metadata that identifies where the nonzero elements are located in the sparse matrix. One common sparse matrix format is Compressed Sparse Row (CSR), which represents a matrix using three one-dimensional arrays. Within the CSR format, a first array stores nonzero matrix values in the matrix (in the order of row-by-row traversal of the matrix), a second array stores column indexes of the nonzero matrix values, and a third array stores, for each row in the matrix, the cumulative number of nonzero matrix values up to (but not including) that row.

One drawback of compressed formats for sparse matrices is that these compressed formats are not optimized for use with highly parallel accelerators such as graphics processing units (GPUs). In this regard, to process a sparse matrix efficiently using a parallel processor, a compressed format should allow various matrix elements or various rectangular "tiles" that group the nonzero matrix element values together to be arbitrarily accessed, include a balanced number of nonzero matrix element values across tiles, structure tiles to be "compact" along various dimensions of the sparse matrix (e.g., in order to reduce the amount of data accessed from other matrices during matrix multiplication operations), and provide efficient storage of and access to the metadata that indicates the coordinates of the nonzero element values within the sparse matrix.

However, conventional compressed formats used for sparse matrices do not address all of these considerations. For example, because the CSR format divides nonzero matrix elements into tiles corresponding to individual rows in a matrix and indexes the nonzero matrix elements by row number, the CSR format allows for efficient row lookups in the matrix. However, the CSR format does not allow for efficient column lookups or straightforward load-balancing across rows, which can have different numbers of nonzero matrix element values. The CSR format further fails to maintain compactness along the horizontal dimensions of the matrix, since nonzero matrix element values in the matrix are organized along entire rows of the matrix. Consequently, parallelization of workloads for multiplying or otherwise processing sparse matrices in CSR formats on multiple GPU cores can result in an uneven distribution of row-based loads across the GPU cores, slow lookup and retrieval of nonzero elements along columns of the sparse matrices, and/or an increase in the amount of data accessed from another matrix during multiplication of the rows of the sparse matrix with columns of the other matrix.

To improve processing of matrix processing workloads on GPUs or other highly parallel accelerators, a sparse matrix can be recursively divided along one or more types of boundaries until one or more thresholds are met. In some embodiments, the sparse matrix is repeatedly divided into quadrants (or other equally sized regions) that contain nonzero elements until a first threshold for region size is met. A given region that meets the threshold for region size can be further divided along a "split point" that separates the region into two or more regions of substantially equal numbers of nonzero elements until the number of nonzero elements in a given region falls below a second threshold.

A tree structure is also created to index the nonzero elements in the sparse matrix. The root node of the tree structure represents the entire sparse matrix, and child nodes of the root node represent one or more quadrants of nonzero values into which the sparse matrix is divided. Additional layers of child nodes are added to the tree structure to represent quadrants into which regions represented by the corresponding parent nodes are divided until all quadrants are represented by nodes in the tree structure.

When a smallest quadrant in the sparse matrix is further divided into regions with substantially the same numbers of nonzero elements, nodes representing those regions are added as child nodes of the node representing the smallest quadrant in the tree structure. Additional layers of child nodes may optionally be added to the tree structure to represent regions into which regions represented by the corresponding parent nodes are divided until all regions are represented by nodes in the tree structure. When a region that includes nonzero elements in the sparse matrix is not further subdivided, a first node representing a "payload region" that stores the nonzero elements within the region is added to the tree structure as a child of a second node representing the region.

The tree structure can then be used to store and access the nonzero elements in the sparse matrix. For example, the tree structure could be generated to store the sparse matrix in a compressed format and reduce storage overhead associated with storing the uncompressed sparse matrix. In another example, the tree structure could be loaded into a CPU, a GPU, a specialized accelerator that implements a tree-traversal engine, and/or another type of processor. The processor uses the tree structure to process a query for a specific "region of interest" in the sparse matrix (e.g., a region to be multiplied with a corresponding region of another matrix during a matrix multiplication operation) and returns payload regions represented by leaf nodes in the tree structure that overlap with the region of interest. The processor also, or instead, performs matrix multiplication and/or other types of matrix operations using the retrieved payload regions.

Because the payload regions have similar numbers of nonzero elements, similar numbers of payload regions can be distributed across multiple processors or processor cores to balance matrix-processing workloads on the processors or processor cores. In addition, the recursive division of the sparse matrix into quadrants prior to creating the payload regions within the quadrants improves the compactness of the payload regions, thereby reducing the amount of data accessed from other matrices to perform matrix multiplication (or other matrix processing operations) involving the sparse matrix and the other matrices. Consequently, the tree structure provides a compressed sparse matrix format that improves parallel processing of workloads involving sparse matrices and reduces overhead associated with storing and accessing data in the sparse matrices.

System Overview

FIG. 1 is a block diagram illustrating a computer system 100 configured to implement one or more aspects of various embodiments. In some embodiments, computer system 100 is a machine or processing node operating in a data center, cluster, or cloud computing environment that provides scalable computing resources (optionally as a service) over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIG. 2, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

In one or more embodiments, parallel processing subsystem 112 includes a traversal engine 122 that accesses a tree structure 124 to identify and/or retrieve regions of nonzero elements 103 during matrix multiplication and/or other matrix operations. As discussed in further detail below, these matrix operations can be performed using parallel processing subsystem 112, CPU 102, and/or other processors in computer system 100.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
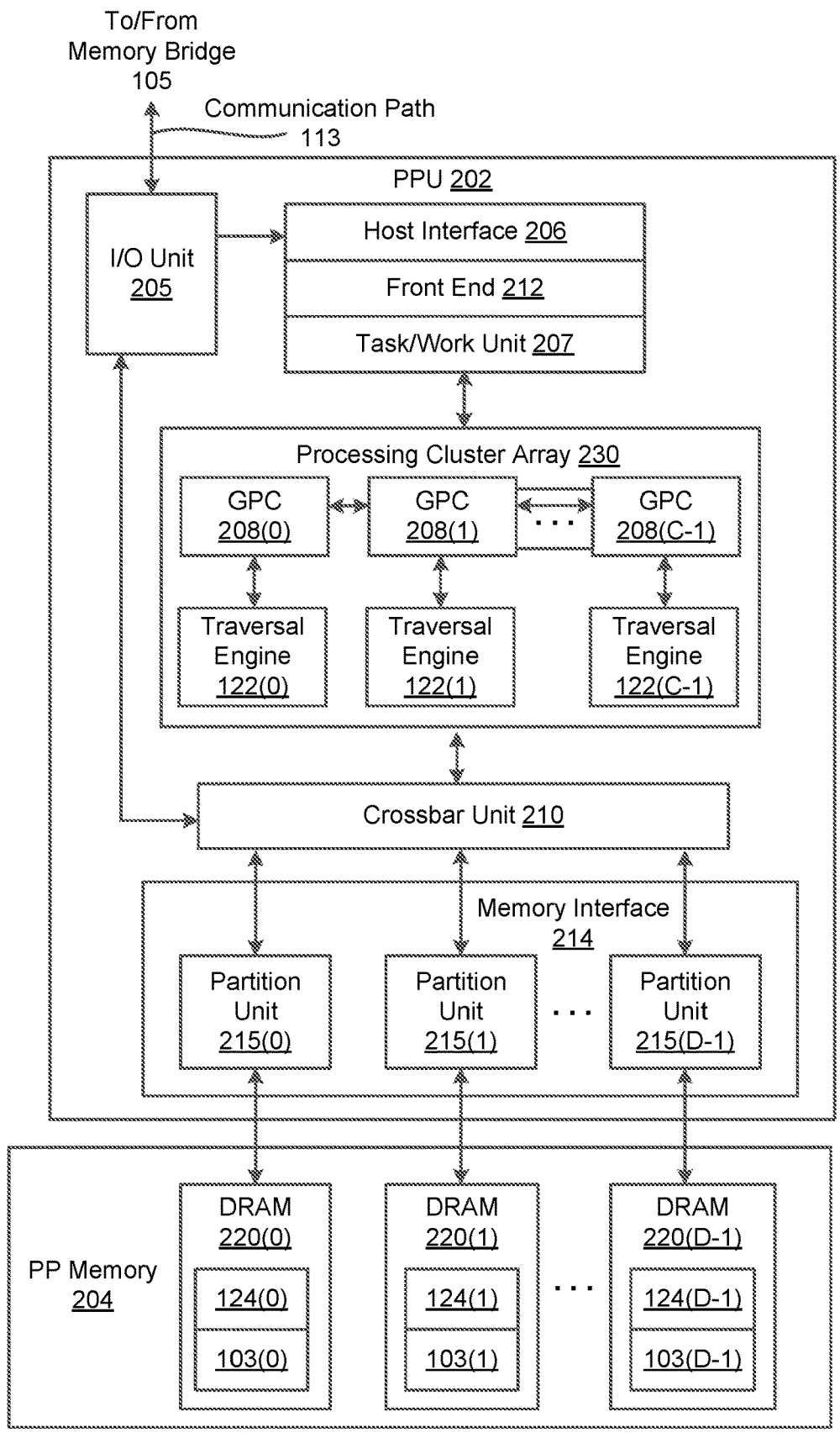
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 can include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 includes a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

As mentioned above, CPU 102 can operate as a master processor that controls and coordinates operations of other system components in computer system 100. In one embodiment, CPU 102 issues commands that control the operation of PPU 202. For example, CPU 102 could write a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by front end 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D partition units 215, where D≥1. Each partition unit 215 is coupled to one or more dynamic random access memories (DRAMs) 220 residing within PP memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

As shown, each GPC 208 has access to a corresponding instance of traversal engine 122, and each DRAM 220 in PP memory 204 stores a partial or complete copy of tree structure 124 and nonzero elements 103. For example, each GPU 208 could communicate with a separate accelerator implementing traversal engine 122 to retrieve regions of nonzero elements 103 from a sparse matrix that is indexed using tree structure 124. These retrieved regions could then be used to multiply the sparse matrix with one or more other sparse or dense matrices and/or perform other types of matrix operations. Traversal engine 122 and tree structure 124 are described in further detail below with respect to FIGS. 3-5.

Those skilled in the art will appreciate that traversal engine 122, tree structure 124, and nonzero elements 103 may be implemented, replicated, or distributed within the systems of FIGS. 1 and 2 multiple ways. First, one or more portions of tree structure 124 may be stored in on-chip memory (e.g., static random access memory (SRAM), scratchpad memory, an on-chip cache, etc.) for each GPC 208, in lieu of or in addition to storing tree structure 124 on DRAM 220 in PP memory 204. A given GPC 208 or traversal engine 122 may use direct memory access (DMA) to transfer portions of tree structure 124 between DRAM 220 and the on-chip memory. Second, one or more regions of nonzero elements 103 may be stored in an L2 cache in each partition unit 215, in lieu of or in addition to being stored on DRAM 220 in PP memory 204. Third, one traversal engine 122 may be implemented per GPC 208, or one or more instances of traversal engine 122 may be shared by multiple GPCs 208. Fourth, traversal engine 122 may be implemented by one or more GPCs 208, one or more CPUs, and/or by a standalone accelerator that processes requests from one or more GPCs 208.

Optimizing Sparse Matrix Representations

Figure 3:
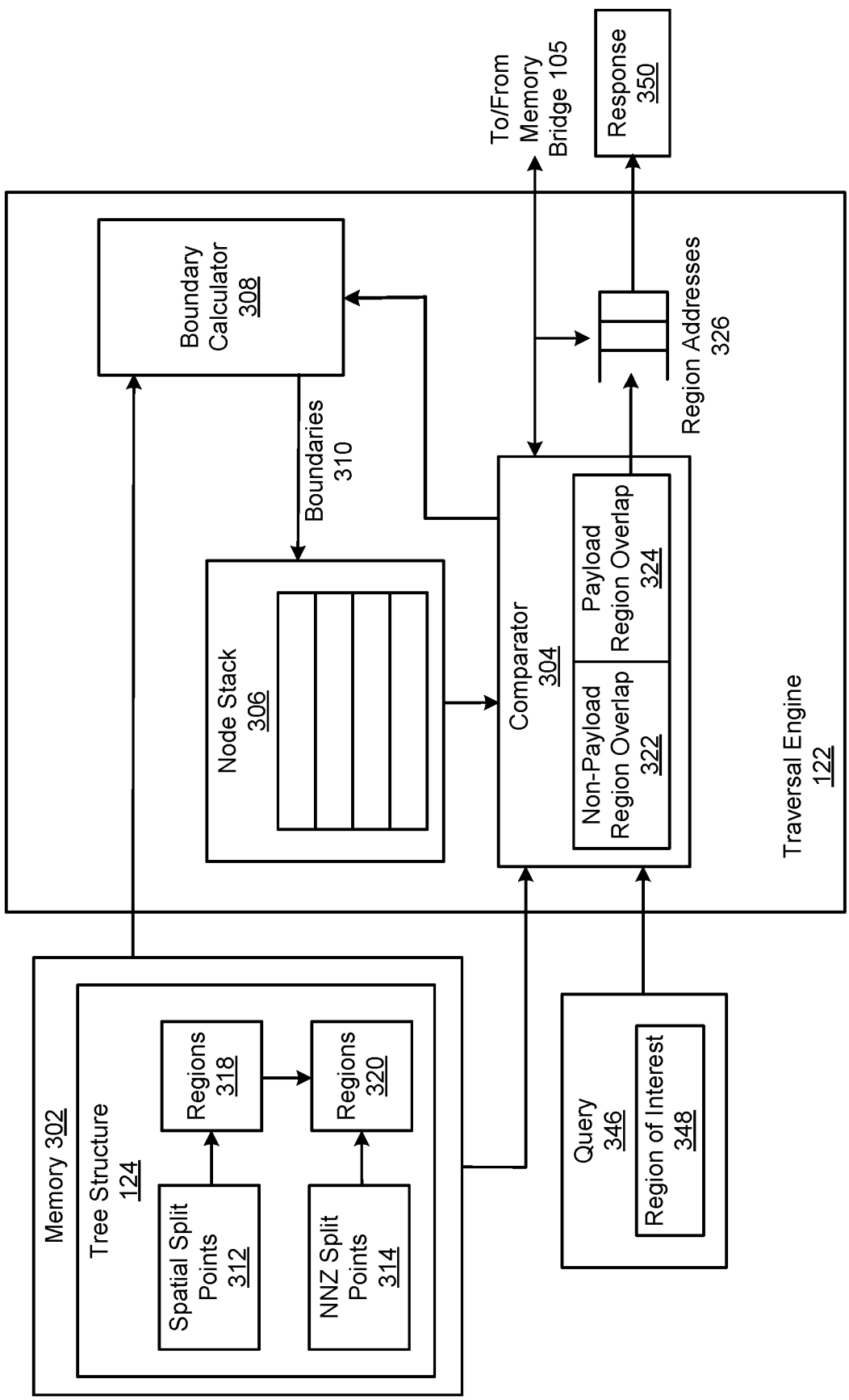
FIG. 3 is a more detailed illustration of one of the traversal engines of FIG. 2, according to various embodiments.

FIG. 3 is a more detailed illustration of traversal engine 122 of FIGS. 1-2, according to various embodiments. As mentioned above, traversal engine 122 accesses tree structure 124 stored in a memory 302 (e.g., on-chip SRAM, DRAM 220, etc.) to identify and/or retrieve one or more regions 318 and/or 320 of a sparse matrix during matrix multiplication and/or other matrix operations involving the sparse matrix. Tree structure 124 and the operation of traversal engine 122 with respect to tree structure 124 are described in further detail below with respect to FIGS. 3, 4A-4C, and 5.

In one or more embodiments, tree structure 124 includes nodes representing a first set of regions 318 of nonzero elements in the sparse matrix that are repeatedly divided along a number of spatial split points 312 until a first threshold is met. For example, regions 318 could be formed by dividing a 2D sparse matrix along horizontal and vertical spatial split points 312 (e.g., midpoints) into four regions corresponding to quadrants of substantially equal size, subdividing each region that includes nonzero elements along corresponding horizontal and vertical spatial split points 312 into four additional regions 318 of substantially equal size, and so on until regions 318 of nonzero elements reach a threshold for region size (e.g., a certain number of elements in each matrix dimension). In turn, tree structure 124 could include a root node representing the sparse matrix, up to four child nodes of the root node representing non-empty quadrants into which the sparse matrix is divided, and additional layers of child nodes representing additional regions into which a given region is divided along corresponding spatial split points 312.

Figure 4A:
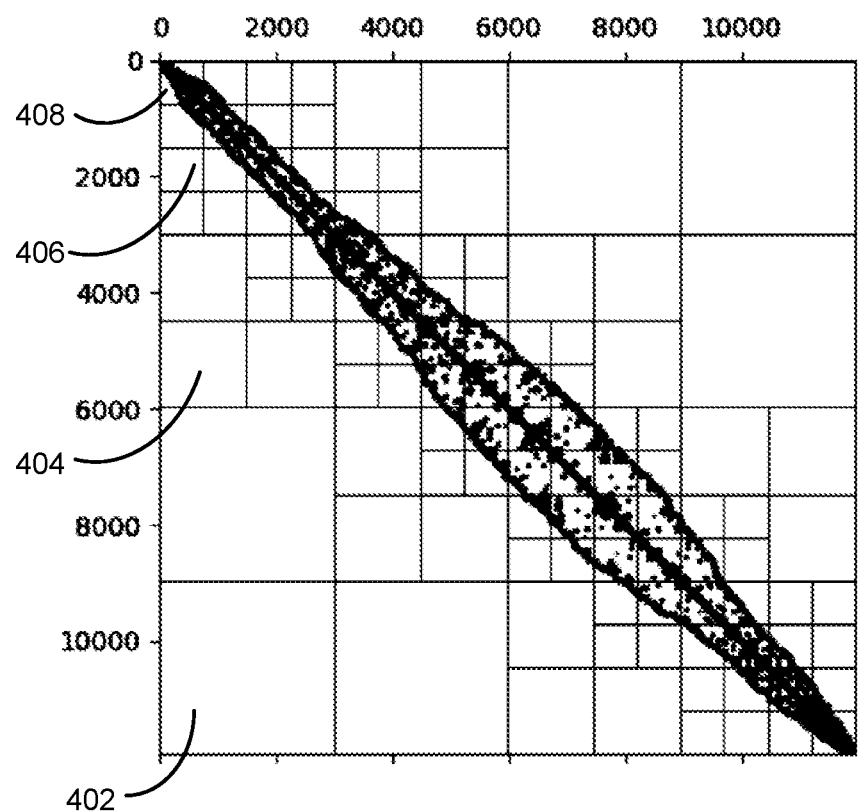
FIG. 4A illustrates an exemplar recursive division of a sparse matrix along spatial split points, according to various embodiments.

FIG. 4A illustrates an exemplar recursive division of a sparse matrix along spatial split points 312 of FIG. 3, according to various embodiments. As shown, the sparse matrix includes nonzero elements that are distributed along a diagonal from the upper left corner of the sparse matrix to the lower right corner of the sparse matrix.

The sparse matrix of FIG. 4A is recursively divided into regions representing non-empty quadrants of substantially equal size until a threshold for quadrant size is reached. Thus, all nonzero elements in the sparse matrix can be found in regions that meet the threshold for quadrant size. Conversely, regions that are larger than the threshold for quadrant size do not have nonzero elements.

Illustratively, the sparse matrix of FIG. 4A includes a first region 402, a second region 404 that is smaller than region 402, a third region 406 that is smaller than region 402, and a fourth region 408 that is the same size as region 408. Region 402 is formed by dividing the sparse matrix into a first set of quadrants, then dividing the lower left quadrant in the first set of quadrants into a second set of quadrants. Since region 402 corresponds to an empty lower left quadrant in the second set of quadrants, region 402 is not subdivided further.

Region 404 is formed by dividing the upper left quadrant in the first set of quadrants into a third set of quadrants, then dividing the lower left quadrant in the third set of quadrants into a fourth set of quadrants. Since region 404 corresponds to an empty lower left quadrant in the fourth set of quadrants, region 404 is not subdivided further.

Regions 406 and 408 are formed by divided the upper left quadrant in the third set of quadrants into a fifth set of quadrants, then dividing the upper left quadrant in the fifth set of quadrants into a sixth set of quadrants and dividing the lower left quadrant in the fifth set of quadrants into a seventh set of quadrants. Regions 406 and 408 have the same size, which is a size that meets the threshold for quadrant size in the sparse matrix (e.g., around 700-800 elements in each dimension). Region 408 corresponds to a non-empty upper left quadrant in the sixth set of quadrants, and region 406 corresponds to an empty upper left region in the seventh set of quadrants.

Returning to the discussion of FIG. 3, tree structure 124 also includes nodes representing a second set of regions 320 of nonzero elements formed within a subset of regions 318, which are repeatedly divided along a number of nonzero elements (NNZ) split points 314 until a second threshold is met. Each NNZ split point 314 represents a horizontal, vertical, and/or another line that divides a given region into two regions with substantially the same numbers of nonzero elements. Continuing with the above example, one or more of the smallest regions 318 of nonzero elements could be further divided along corresponding NNZ split points 314 to form two additional regions 320 that have substantially the same numbers of nonzero elements. These additional regions 320 could optionally be further subdivided along corresponding NNZ split points 314 until the number of nonzero elements in a given region meets or falls below a threshold for the number of nonzero elements in a region. Regions 320 could be represented in tree structure 124 by nodes that descend from nodes representing the smallest regions 318.

Figure 4B:
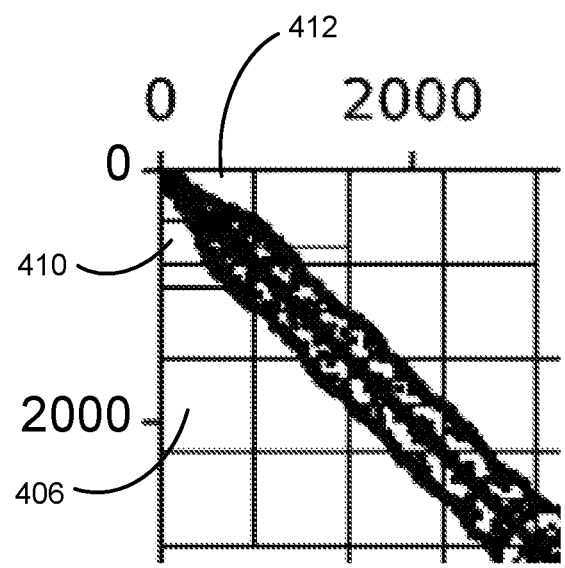
FIG. 4B illustrates an exemplar division of a region of the sparse matrix of FIG. 4A into two regions with substantially the same number of nonzero elements, according to various embodiments.

FIG. 4B illustrates an exemplar division of region 408 of the sparse matrix of FIG. 4A into two regions 410 and 412 with substantially the same numbers of nonzero elements, according to various embodiments. More specifically, region 408 is divided along a horizontal NNZ split point into regions 410 and 412. Each of regions 410 and 412 may also be subdivided along additional horizontal NNZ split points until the number of nonzero elements in a given non-empty region falls under a threshold, as discussed in further detail below with respect to FIG. 4C.

Figure 4C:
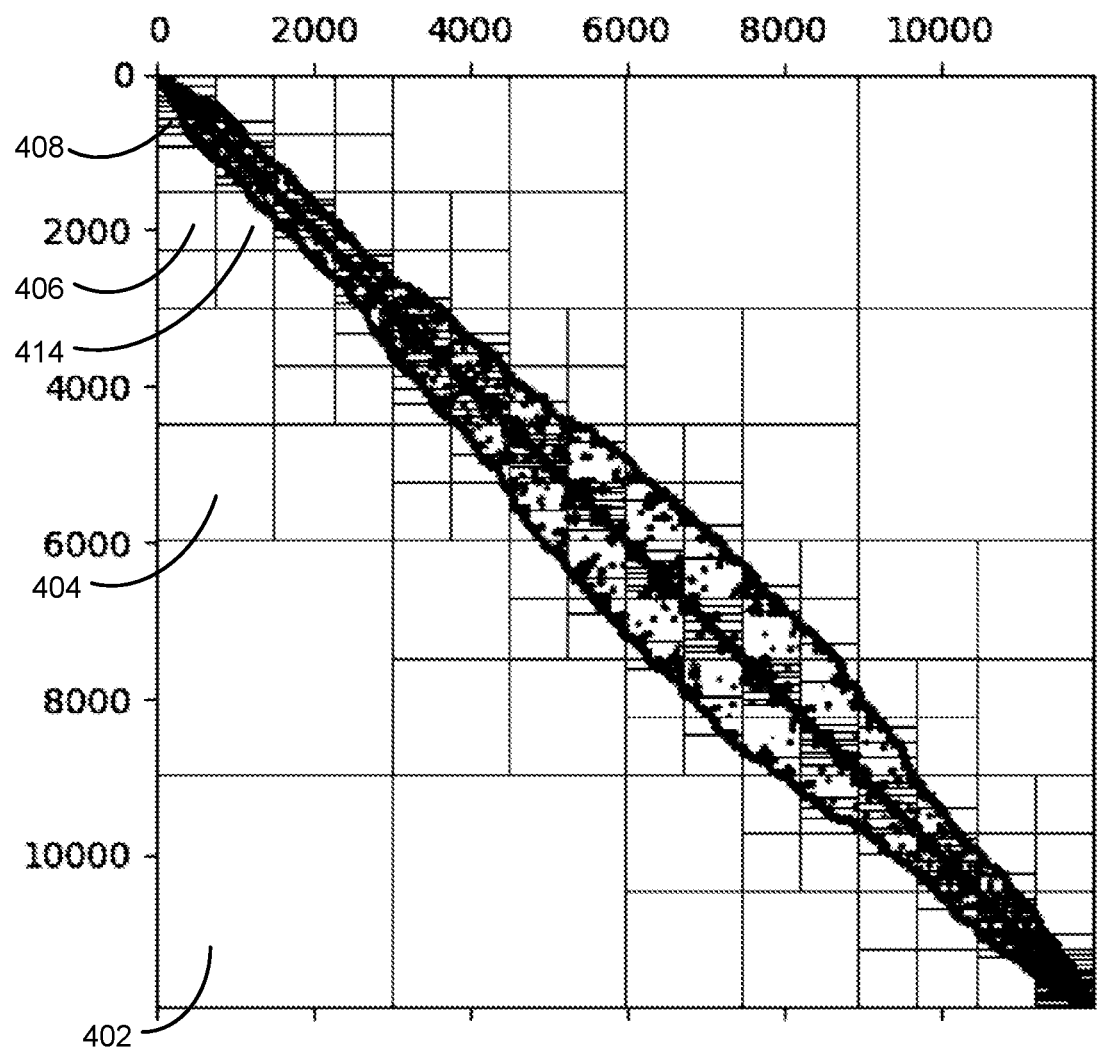
FIG. 4C illustrates an exemplar recursive division of non-empty regions of the sparse matrix of FIG. 4A into smaller regions with substantially the same numbers of nonzero elements, according to various embodiments.

FIG. 4C illustrates an exemplar recursive division of non-empty regions of the sparse matrix of FIG. 4A into smaller regions with substantially the same numbers of nonzero elements, according to various embodiments. In particular, a number of non-empty regions that meet the size threshold for quadrant size in the sparse matrix have been subdivided along one or more horizontal NNZ split points into smaller regions with substantially equal numbers of nonzero elements. These non-empty regions include region 408, which has been subdivided multiple times into a number of smaller regions. These non-empty regions also include other regions along the diagonal portion of the sparse matrix, where all nonzero elements are found.

As shown in FIG. 4C, some non-empty regions that meet the size threshold for quadrant size are not subdivided further because these regions already meet the threshold for the number of nonzero elements. These non-empty regions include a region 414 immediately to the right of region 406, which corresponds to the upper right quadrant of the seventh set of quadrants.

Returning to the discussion of FIG. 3, tree structure 124 further includes a number of leaf nodes representing "payload regions" that store nonzero elements in the sparse matrix. These leaf nodes could be added as child nodes of the smallest regions 318 and/or regions 320. Each payload region represented by a leaf node in tree structure 124 additionally satisfies the region size threshold associated with subdivision of regions 318, as well as the threshold for number of nonzero elements associated with subdivision of regions 320.

Figure 5:
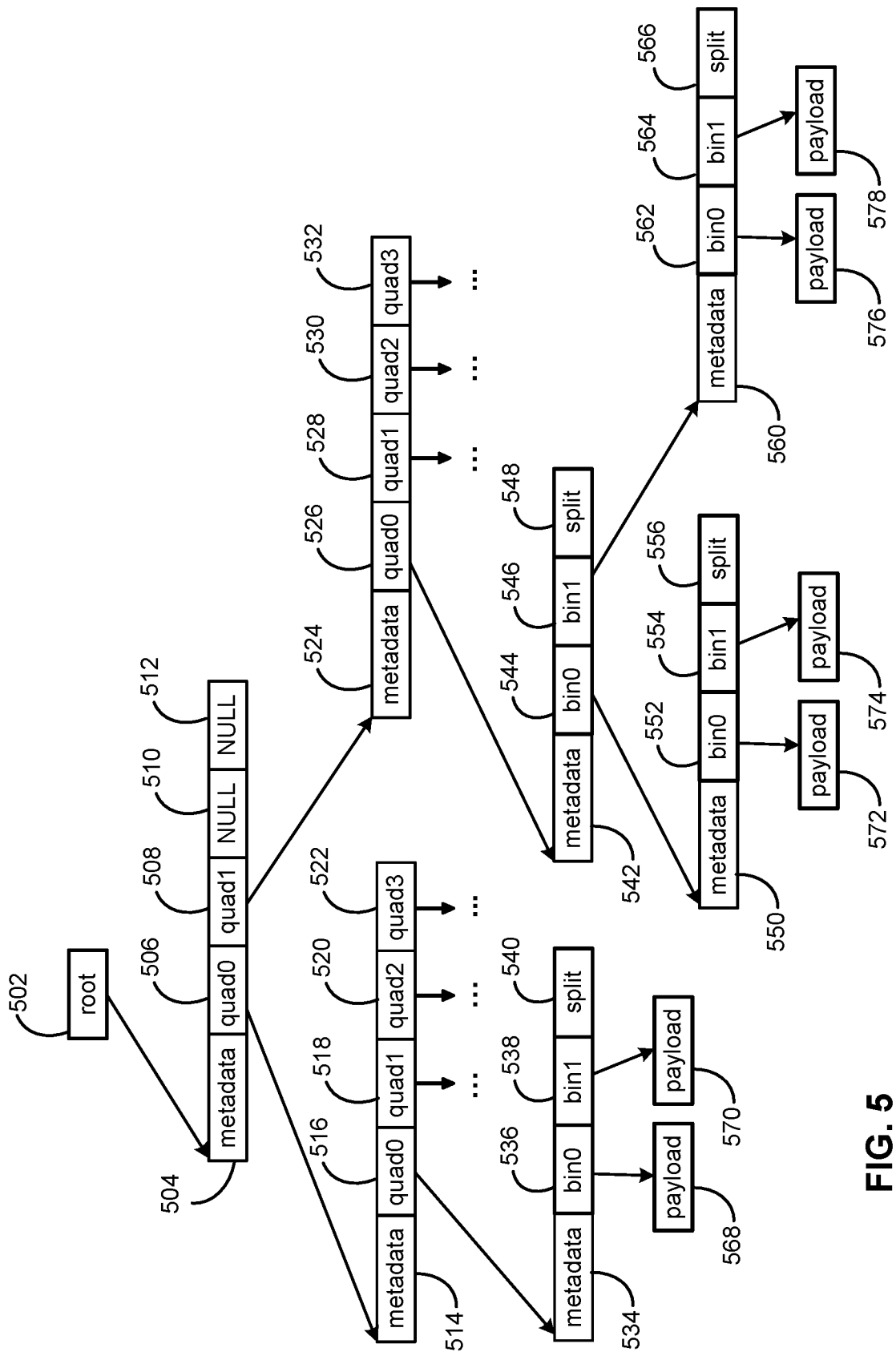
FIG. 5 is an exemplar representation of one of the tree structures of FIG. 2, according to various embodiments.

FIG. 5 is an exemplar representation of tree structure 124 of FIGS. 1-2, according to various embodiments. The top of the exemplar tree structure 124 includes a root node 502 representing a sparse matrix. Below the root node 502, other portions of tree structure 124 are organized into individual stages, with a directed edge from a given node to a stage below the node representing a parent-child relationship between the node and the stage.

As shown in FIG. 5, the exemplar tree structure 124 includes seven stages under the root node 502. Each stage includes metadata that identifies the types of regions represented by nodes in the corresponding stages, as well as the boundaries of the stages. For example, metadata for a stage could include one or more flags or variables indicating whether nodes in the stage represent up to four equally sized quadrants or two regions of substantially equal numbers of nonzero elements. The metadata could also specify the boundaries of the stage (e.g., the top left and bottom right corners of the stage).

In particular, a first stage below the root node 502 includes a portion 504 that stores metadata for the first stage, followed by four nodes 506-512 representing four quadrants into which the sparse matrix represented by node 502 is divided. Nodes 506-508 indicate that the quadrants represented by "quad0" and "quad1" include nonzero elements, while null values in nodes 510-512 indicate that the corresponding quadrants do not include nonzero values and thus are not further subdivided.

A second stage below node 506 includes a portion 514 that stores metadata for the second stage, followed by four nodes 516-522 representing four quadrants into which the region represented by node 506 (i.e., a quadrant denoted as "quad0" in the first stage) is divided. Values of "quad0," "quad1, "quad2," and "quad3" in nodes 516-522 indicate that all four quadrants in the second stage include nonzero elements.

A third stage below node 508 includes a portion 524 that stores metadata for the third stage, followed by four nodes 526-532 representing four quadrants into which the region represented by node 508 (i.e., a quadrant denoted as "quad1" in the first stage) is divided. Values of "quad0," "quad1, "quad2," and "quad3" in nodes 526-532 indicate that all four quadrants in the second stage include nonzero elements.

A fourth stage below node 516 includes a portion 534 that stores metadata for the fourth stage, followed by two nodes 5369538 and an additional portion 540. The two nodes 536-538 represent two regions denoted by "bin0" and "bin1," which have substantially equal numbers of nonzero elements into which the region represented by node 516 is divided. Portion 540 stores a split point (e.g., an x- or y-coordinate) along which the region represented by node 516 is divided to form the two regions in the fourth stage. Nodes 536 and 538 have respective child nodes 568 and 570 representing payload regions that store nonzero elements in the sparse matrix.

A fifth stage below node 526 includes a portion 542 that stores metadata for the fifth stage, followed by two nodes 544-546 and an additional portion 548. The two nodes 544-546 represent two regions denoted by "bin0" and "bin1," which have substantially equal numbers of nonzero elements into which the region represented by node 526 is divided. Portion 548 stores a split point along which the region represented by node 526 is divided to form the two regions in the fifth stage.

A sixth stage below node 544 includes a portion 550 that stores metadata for the sixth stage, followed by two nodes 552-554 and an additional portion 556. The two nodes 552-554 represent two regions denoted by "bin0" and "bin1," which have substantially equal numbers of nonzero elements into which the region represented by node 544 is divided. Portion 556 stores a split point along which the region represented by node 544 is divided to form the two regions in the sixth stage. Nodes 552 and 554 have respective child nodes 572 and 574 representing payload regions that store nonzero elements in the sparse matrix.

A seventh stage below node 546 includes a portion 560 that stores metadata for the seventh stage, followed by two nodes 562-564 and an additional portion 566. Nodes 562-564 represent two regions denoted by "bin0" and "bin1," which have substantially equal numbers of nonzero elements into which the region represented by node 546 is divided. Portion 566 stores a split point along which the region represented by node 546 is divided to form the two regions in the seventh stage. Nodes 562 and 564 have respective child nodes 576 and 578 representing payload regions that store nonzero elements in the sparse matrix.

In some embodiments, nonzero elements in payload regions represented by nodes 568-578 are stored in one or more formats. For example, nonzero elements in the payload regions could be stored using a default compressed sparse matrix format such as CSR. When nonzero elements in a given payload region can be stored more efficiently in another format, the nonzero elements in the payload region could be stored using the other format, and metadata could be added to the payload region to specify the format in which the nonzero elements in the payload region are stored. Continuing with this example, if a payload region included only one row with non-zero values, the payload region could be stored using a custom format that specifies the non-empty row coordinate and a single dense vector of matrix values for the non-empty row. The payload region would also include one or more metadata fields that identified the custom format.

Returning to the discussion of FIG. 3, tree structure 124 can be generated by a hardware or software component and provided to traversal engine 122 for use during matrix multiplication and/or other matrix operations involving the sparse matrix. For example, tree structure 124 could be generated by a processor, a group of processors, or a computer system. Tree structure 124 could then be loaded into memory 302 via a network connection with the other computer system, DMA, and/or another mechanism.

In one or more embodiments, the hardware or software component generates tree structure 124 in a parallel, load-balanced manner. First, the hardware or software components receives the sparse matrix in an uncompressed format or another compressed sparse matrix format. During generation of tree structure 124, the hardware or software component divides the sparse matrix into a grid of the smallest sized regions 318 formed using spatial split points 312 (e.g., regions 318 that meet the threshold for region size). The hardware or software component also assigns each of the smallest sized regions 318 to a different parallel task, which may be performed by a different processor or processor core (e.g., a CPU core, GPC 208, a streaming multi-processor (SM) in a GPU, etc.). Each parallel task analyzes the format in which the sparse matrix is stored or represented to determine whether or not the corresponding smallest sized region is empty. If the corresponding smallest sized region is empty, the parallel task returns with an indication that the corresponding smallest sized region is empty and discontinues processing.

If a smallest sized region assigned to a parallel task is non-empty, one or more tasks are executed to divide the smallest sized region into one or more additional regions 320 along NNZ split points 314 (e.g., x- and/or y-coordinates of boundaries 310 that divide a given region into two regions with substantially equal numbers of nonzero elements). The task(s) also add nodes and stages representing the smallest sized region and additional regions 320 to tree structure 124. The parallel task then builds payload regions (in a designated sparse matrix format) that are bounded by NNZ split points 314 within the smallest sized region. The creation of these payload regions and/or corresponding nodes may optionally be parallelized to further expedite the creation of tree structure 124.

After the payload regions are created, one or more tasks are executed to merge the smallest-sized regions 318 created using spatial split points 312 into larger regions 318 within tree structure 124. For example, the task(s) could group four nodes representing four of the smallest-sized regions 318 that are arranged in a first 2×2 grid under a parent node representing a first region that spans the first 2×2 grid. The task(s) could also group the parent node and three other nodes representing four larger regions 318 that are arranged in a second 2×2 grid under a higher-level parent node representing a second region that spans the second 2×2 grid. Thus, each of these parent nodes would represent a region that is four times larger than any region represented by a corresponding child node. The task(s) may continue merging quadrants (or other groupings) of smaller regions 318 into larger regions 318 until all regions 318 and 320 are represented by nodes in tree structure 124, subdivision of individual regions 318 and 320 into smaller regions is represented by directed edges in tree structure 124, and all nodes in the tree structure are descended from a root node representing the entire sparse matrix.

After tree structure 124 is created and/or loaded into memory 302, traversal engine 122 uses tree structure 124 to process a query 346 for matrix values within a region of interest 348 in the corresponding sparse matrix. For example, traversal engine 122 could receive query 346 from one or more GPCs 208, CPU 102, and/or another processor on computer system 100 (or a remote computer system). Within query 346, region of interest 348 could include the top left and bottom right corners of a rectangular portion of the sparse matrix and/or another representation of the boundaries of the rectangular portion. This portion of the sparse matrix could be retrieved by traversal engine 122 to allow the portion to be multiplied with a corresponding portion of another matrix, as described below with respect to FIG. 6. This portion of the sparse matrix could also, or instead, be retrieved for subsequent processing using another type of matrix operation.

After a given query 346 is received, traversal engine 122 uses tree structure 124 to identify one or more regions 318-320 of nonzero elements in the sparse matrix that overlap with region of interest 348. More specifically, traversal engine 122 uses a comparator 304, a node stack 306 (which may alternatively be implemented as a queue and/or another type of data structure), and boundary calculator 308 to traverse tree structure 124. During the traversal of tree structure 124, traversal engine 122 identifies any payload regions associated with tree structure 124 that overlap with region of interest 348. Traversal engine 122 then generates and transmits a response 350 to query 346, which identifies the overlapping payload regions and/or includes nonzero elements in the overlapping payload regions. Response 350 thus allows the component from which query 346 was received to perform processing related to nonzero elements in region of interest 348.

In some embodiments, traversal engine 122 performs a series of steps to identify payload regions in tree structure 124 that overlap with region of interest 348. First, boundary calculator 308 reads from memory 302 to access tree structure 124, starting from the root node, which represents the entire sparse matrix, down to one or more leaf nodes representing payload regions in the sparse matrix. At a given stage of tree structure 124 (i.e., a grouping of child nodes under a parent node), boundary calculator 308 pushes all nodes representing non-empty regions 318 or regions 320 in that stage onto node stack 306.

The operation of boundary calculator 308 in pushing nodes representing non-empty regions in a given stage onto node stack 306 may be represented by the following pseudo-code:

```
IF (STAGE.type == QUAD) {
    // do quad 0
    If (STAGE.quad0.child != NULL) {
        NODE.UL.x = STAGE.UL.x
        NODE.UL.y = STAGE.UL.y
        NODE.LR.x = (STAGE.UL.x + STAGE.LR.x)/2
        NODE.LR.y = (STAGE.UL.y + STAGE.LR.y)/2
        NODE.child = STAGE.quad0.child
        NODE.child_is_payload = STAGE.quad0.child_is_payload
        Push(NODE) // push the node on the node stack
    }
    // do quad 1
```

-continued

```
If (STAGE.quad1.child != NULL){
        NODE.UL.x = (STAGE.UL.x + STAGE. LR.x)/2 + 1
        NODE.UL.y = STAGE.UL.y
        NODE.LR.x = STAGE.LR.x
        NODE.LR.y = (STAGE.UL.y + STAGE.LR.y)/2
        NODE.child = STAGE.quad1.child
        NODE.child_is_payload = STAGE.quad1.child_is_payload
        Push(NODE) // push the node on the node stack
    }
    // do quad 2
    If (STAGE.quad2.child != NULL) {
        NODE.UL.x = STAGE.UL.x
        NODE.UL.y = (STAGE.UL.y + STAGE. LR.y)/2 + 1
        NODE.LR.x = (STAGE.UL.x + STAGE.LR.x)/2
        NODE.LR.y = STAGE.LR.y
        NODE.child = STAGE.quad2.child
        NODE.child_is_payload = STAGE.quad2.child_is_payload
        Push(NODE) // push the node on the node stack
    }
    // do quad 3
    If (STAGE.quad3.child != NULL) {
        NODE.UL.x = (STAGE.UL.x + STAGE. LR.x)/2 + 1
        NODE.UL.y = (STAGE.UL.y + STAGE. LR.y)/2 + 1
        NODE.LR.x= STAGE.LR.x
        NODE.LR.y = STAGE.LR.y
        NODE.child = STAGE.quad3.child
        NODE.child_is_payload = STAGE.quad3.child_is_payload
        Push(NODE) // push the node on the node stack
    }
} else {// STAGE.type == NON_UNIFORM
    // do bin 0
    NODE.UL.x = STAGE.UL.x
    NODE.UL.y = STAGE.UL.y
    NODE.LR.x = STAGE.LR.x
    NODE.LR.y = STAGE. split_point
    NODE.child = STAGE.bin0.child
    NODE.child_is_payload = STAGE.bin0.child_is_payload
    Push(NODE) // push the node on the node stack
    // do bin 1
    NODE.UL.x = STAGE.UL.x
    NODE.UL.y = STAGE.split_point + 1
    NODE.LR.x = STAGE.LR.x
    NODE.LR.y = STAGE.LR.y
    NODE.child = STAGE.binI .child
    NODE.child_is_payload = STAGE.bin1.child_is_payload
    Push(NODE) // push the node on the node stack
}
```

According to the above pseudocode, boundary calculator 308 performs an initial comparison of the region type represented by the stage (e.g., as specified in metadata for the stage) to a value of "QUAD." If the region type matches "QUAD," traversal engine 122 iterates over the four nodes in the stage (denoted by "quad0," "quad1," quad2," and "quad3") that represent quadrants formed within a 2D sparse matrix and/or a region in the sparse matrix. When a given node in the stage has a non-null child node or stage (indicating that the corresponding quadrant includes nonzero elements), boundary calculator 308 uses the boundaries of the region represented by the stage (e.g., as specified in metadata for the stage) to calculate spatial split points 312 representing boundaries 310 of the quadrant represented by the node in the stage. Boundary calculator 308 also populates a "NODE" object with boundaries 310 of the quadrant, a child node or stage of the node, and a binary value indicating whether or not the child node or stage represents a payload region. Traversal engine 122 then pushes the "NODE" object onto node stack 306.

Continuing with the above pseudocode, if the region type does not match "QUAD," boundary calculator 308 performs processing related to a stage of nodes representing two non-uniform regions of substantially equal numbers of nonzero elements, into which a larger region represented by a parent node of the stage has been divided. For this type of stage, boundary calculator 308 uses the boundaries of the region represented by the stage and the NNZ split point for the stage (e.g., as specified in metadata for the stage) to determine boundaries 310 of each of the non-uniform regions. Boundary calculator 308 populates a "NODE" object with boundaries 310 of each non-uniform region, a child node or stage of the node, and a binary value indicating whether or not the child node or stage represents one or more payload regions. Boundary calculator 308 then pushes the "NODE" object onto node stack 306.

After one or more nodes have been pushed onto node stack 306, comparator 304 pops the topmost node off of node stack 306 and determines whether or not the region represented by the node overlaps with region of interest 348. Traversal engine 122 then performs additional processing related to the output of comparator 304 and the type of region (payload or non-payload) represented by the node.

The operation of comparator 304 in determining overlap between a region represented by a node from node stack 306 and region of interest 348 may be represented by the following pseudocode:

```
is_overlap = !((QUERY.UL.x > NODE.LR.x) ||
    (NODE.UL.x > QUERY.LR.x) ||
    (QUERY.UL.y > NODE.LR.y) ||
    (NODE.UL.y > QUERY.LR.y))
```

In the above pseudocode, "QUERY" stores values related to the boundaries of region of interest 348, and "NODE" stores values related to boundaries 310 of the region represented by the node popped from node stack 306.

According to the above pseudocode, comparator 304 performs a number of comparisons to generate four Boolean values representing:
  whether the upper left x-coordinate of region of interest 348 is to the right of the lower right x-coordinate of the region represented by the node
  whether the upper left x-coordinate of the region represented by the node is to the right of the lower right x-coordinate of region of interest 348
  whether the upper left y-coordinate of region of interest 348 is lower than the lower right y-coordinate of the region represented by the node
  whether the upper left y-coordinate of the region represented by the node is lower than the lower right y-coordinate of region of interest 348

If any of these Boolean values is set to true, comparator 304 determines that the region represented by the node does not overlap with region of interest 348. If all of these Boolean values are set to false, comparator 304 determines that the region represented by the node overlaps with region of interest 348.

When comparator 304 determines that the region represented by the node popped off of node stack 306 does not overlap with region of interest 348, traversal engine 122 omits additional processing related to the node. When comparator 304 identifies overlap between the region represented by the node popped off of node stack 306 and region of interest 348, traversal engine 122 performs processing based on the type of region (payload or non-payload) represented by the node. If comparator 304 establishes a non-payload region overlap 322 between a non-payload region represented by the node and region of interest 348, boundary calculator 308 retrieves a stage that is the child of the node (e.g., using the "NODE.child" field in the node) and pushes nodes from the retrieved stage onto node stack 306 (e.g., using the above pseudocode). If comparator 304 establishes a payload region overlap 324 between a payload region represented by the node and region of interest 348, traversal engine 122 adds the address of the payload region to a list of region addresses 326.

Traversal engine 122 continues using boundary calculator 308 to push nodes from tree structure 124 onto node stack 306, using comparator 304 to determine overlap (or lack of overlap) between each region represented by a node popped off of node stack and region of interest 348, and performing additional processing related to the output of comparator 304 until node stack 306 is empty. At this point, traversal engine 122 has identified a set of region addresses 326 for payload regions in the sparse matrix that overlap with region of interest 348.

Traversal engine 122 then uses the list of region addresses 326 for payload regions in the sparse matrix that overlap with region of interest 348 to generate response 350. For example, traversal engine 122 could include the list of region addresses 326 in response 350 and transmit response 350 to the component from which query 346 was received. The component could then use region addresses 326 to retrieve the respective payload regions from DRAM 220 and/or another memory location and perform matrix processing related to the retrieved payload regions and/or region of interest 348. In another example, traversal engine 122 could retrieve the payload regions located at region addresses 326 and return the contents of the payload regions in response 350. In a third example, traversal engine 122 could retrieve the payload regions located at region addresses 326, calculate the intersections of the retrieved payload regions with region of interest 348, and return nonzero elements that fall within region of interest 348 in response 350.

Those skilled in the art will appreciate that tree structure 124 and traversal engine 122 may be adapted to matrices of varying numbers of dimensions. For example, a 3D sparse matrix that stores a point cloud, mesh, or another 3D representation of an object or scene could be repeatedly divided along x-, y-, and z-axis spatial split points 312 into regions 318 representing octants of the 3D sparse matrix (or a smaller region within the 3D sparse matrix) until a threshold for octant size is reached. Octants having numbers of nonzero elements could then be further subdivided along one or more NNZ split points 314 until a threshold for the number of nonzero elements in a region is met.

Those skilled in the art will also appreciate that traversal engine 122 may be adapted to determine overlap or lack of overlap between various regions 318-320 in tree structure 124 and a non-rectangular region of interest 348. For example, traversal engine 122 could be configured to identify and/or return 2D or 3D payload regions associated with tree structure 124 that overlap with a given region of interest 348 that has a circular, elliptical, spherical, non-rectangular polygon, polyhedral, conical, cylindrical, or arbitrary or freeform shape.

Accelerator for Performing Sparse Matrix Multiplication

Figure 6:
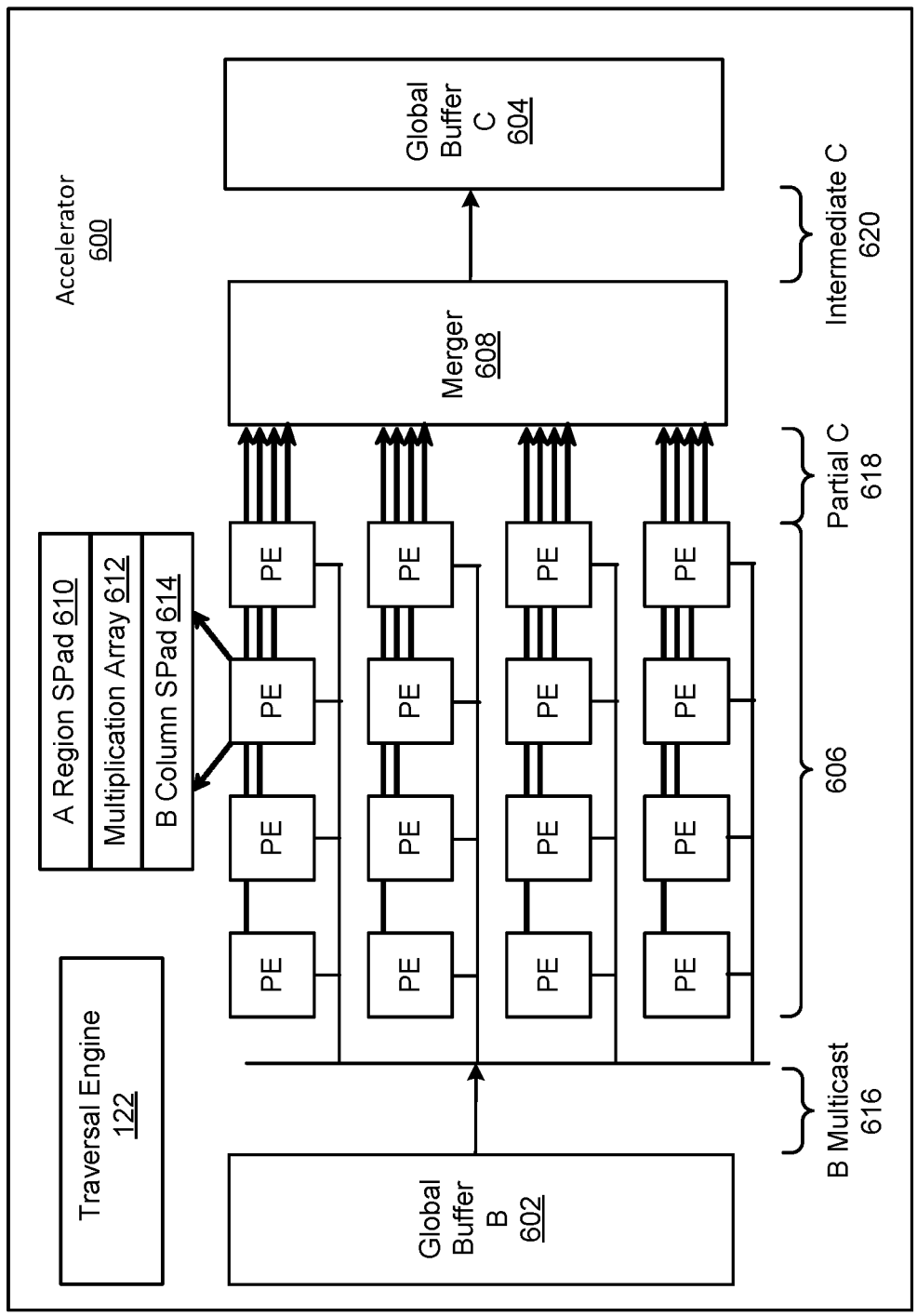
FIG. 6 illustrates an exemplar architecture of an accelerator for performing matrix multiplication computations using a sparse matrix, according to various other embodiments.

FIG. 6 illustrates an exemplar architecture for an accelerator 600 for performing sparse matrix multiplication, according to various embodiments. As shown, accelerator 600 includes traversal engine 122, a global buffer B 602, a grid 606 of independently operating processing elements (PEs), a merger 608 component, and a global buffer C 604. Each of these components is described in further detail below.

In one or more embodiments, accelerator 600 is used to multiply a first input matrix A with a second input matrix B to produce an output matrix C (i.e., A×B=C). The first matrix A may include a sparse matrix that is indexed using tree structure 124 and accessed via traversal engine 122 using the techniques discussed above.

At least a portion of the second matrix B is stored in global buffer B 602. For example, some or all columns of matrix B could be stored in CSR, CSC, and/or another compressed format within global buffer B 602, with the amount of matrix B stored in global buffer B 602 subject to the size of global buffer B 602. Alternatively or additionally, matrix B could include another sparse matrix that is stored and/or indexed using the same type of tree structure as matrix A, and global buffer B 602 could be replaced by another instance of traversal engine 122 to allow for efficient storage and retrieval of nonzero portions of matrix B during multiplication with matrix A. Global buffer B 602 could also, or instead, be populated using data that is retrieved from nonzero portion of matrix B using the other instance of traversal engine 122.

Individual portions of matrix A from traversal engine 122 are passed to individual PEs in grid 606, and one or more corresponding columns of matrix B from global buffer B 602 are transmitted via a B multicast 616 operation to corresponding PEs in grid 606. Each PE stores a portion of matrix A received from traversal engine 122 in an A region scratchpad 610. Each PE also stores one or more columns (or partial columns) of matrix B received via B multicast 616 in a B column scratchpad 614. Each PE further includes a multiplication array 612 that multiplies the portion of A stored in A region scratchpad 610 with the corresponding column(s) (or partial columns) of B stored in B column scratchpad 614 to produce a partial C 618 result.

For example, matrix A and matrix B could include 160× 160 square matrices. The first ten rows of matrix A (having dimensions of 10×160) could be divided into 16 10×10 portions that are distributed across 16 PEs in grid 606, with each PE storing the corresponding 10×10 portion of matrix A in A region scratchpad 610. The first ten columns of matrix B (having dimensions of 160×10) would also be retrieved from global buffer B 602 and provided to all 16 PEs via B multicast 616, with each PE storing all ten columns in B column scratchpad 614. In other words, the PEs would receive and store non-overlapping "chunks" of the first 10 rows of column A, as well as all of the first 10 columns of matrix B required to compute partial C 618 results that span the first 10 rows of matrix C. In turn, multiplication array 612 in each PE could include one or more groups of double-precision floating-point multipliers that compute, from the data in A region scratchpad 610 and B column scratchpad 614, a 10×10 partial matrix representing partial C 618 for that PE.

Merger 608 receives individual partial C 618 results from PEs in grid 606 and combines partial C 618 results from multiple PEs into one or more intermediate C 620 results. Continuing with the above example, if B column scratchpad 614 is not large enough to store 10 full columns of matrix B, B multicast 616 could be modified to the first 80 rows of the first 10 columns of matrix B to each of the PEs. Each PE would store the first 80 rows of the first 10 columns of matrix B in a corresponding B column scratchpad 614 and use multiplication array 612 to compute a partial C 618 result as the product of the portion of matrix A in A region scratchpad 610 and the portion of the first 10 columns in B column scratchpad 614. After a given PE finishes computing a partial C 618 result, the PE transmits partial C 618 to merger 608. After all PEs have computed a first round of partial C 618 results from the respective portions of matrix A in A region scratchpad 610 and the first 80 rows of the first 10 columns in B column scratchpad 614, a new B multicast 616 could be used to transmit the last 80 rows of the first 10 columns in matrix B to grid 606, and each PE in grid 606 would store the last 80 rows of the first 10 columns in matrix B in B column scratchpad 614. Each PE would then use multiplication array 612 to compute an additional partial C 618 result as the portion of matrix A in A region scratchpad 610 and the last 80 rows of the first 10 columns in B column scratchpad 614, and merger 608 would receive a second round of partial C 618 results computed by the PEs from the respective portions of matrix A in A region scratchpad 610 and the last 80 rows of the first 10 columns in B column scratchpad 614. Merger 608 would then sum the two partial C 618 results computed by each PE into an intermediate C 620 result of the multiplication of the portion of matrix A assigned to that PE with the first 10 columns of matrix B.

Each intermediate C 620 result produced by merger 608 is stored in global buffer C 604. Multiple intermediate C 620 results from multiple passes of matrix A data and matrix B data through grid 606 may then be combined by global buffer C 604 and/or another component into a final result corresponding to matrix C.

In one or more embodiments, the indexing and retrieval of data from matrix A (and optionally matrix B) via tree structure 124 and traversal engine 122 provides a number of performance improvements to the matrix multiplication operations performed by accelerator 600. First, the partitioning of a sparse input matrix (e.g., matrix A and/or matrix B) into spatially compact, non-empty regions with similar numbers of nonzero elements improves the distribution of load across the PEs. For example, traversal engine 122 could use tree structure 124 to identify and/or retrieve one or more payload regions that overlap with a certain range of rows in the input matrix, and accelerator 600 could distribute the retrieved payload region(s) across the PEs in grid 606. Because the payload regions are compact and have similar numbers of nonzero elements, processing load across the PEs is more likely to be evenly distributed than compressed sparse matrix formats that do not partition sparse matrices into compact regions and/or regions with substantially the same numbers of nonzero elements. Accordingly, the utilization and synchronization of the PEs in a given round of partial C 618 computations is improved, which allows accelerator 600 to deploy new portions of one or both matrices to the PEs in additional rounds of partial C 618 computations more quickly and efficiently.

Second, the compactness of the payload regions reduces the number of memory accesses used to retrieve the payload regions during the matrix multiplication computations. In contrast, CSR, CSC, or other compressed sparse matrix formats can fully span one or more dimensions of a given sparse matrix and thus require multiple memory accesses to the same region (e.g., a row or column of a matrix) to perform the same matrix multiplication computations.

Those skilled in the art will appreciate that accelerator 600 may be implemented, structured, and/or used in a variety of ways. First, accelerator 600 may be a specialized processor that is included with a CPU, GPU, and/or another type of processor on a system on a chip (SoC). In turn, the SoC could be used to operate an autonomous vehicle, mobile device, and/or another type of computing device. Second, traversal engine 122, PEs in grid 606, and/or merger 608 may be implemented using one or more processors, processor cores, Field Programmable Gate Arrays (FPGAs), Coarse Grained Reconfigurable Architectures (CGRAs), Application Specific Integrated Circuits (ASICs), systolic arrays, and/or other types of processors or circuits. Third, multiple grids of PEs may be distributed across multiple processors and/or processor cores on accelerator 600. Fourth, global buffer B 602, merger 608, and/or global buffer C 604 may be implemented using one or more on-chip caches, SRAM, DRAM, and/or other types of memory or storage. Fifth, accelerator 600 may be adapted to other types of matrix operations involving sparse matrices, such as (but not limited to) matrix additions, matrix subtractions, matrix-vector multiplications, convolutions, applying linear transformations to sparse matrices, matrix decompositions, matrix inverses, and/or matrix exponentials.

Workflows for Optimized Sparse Matrix Representations

Figure 7:
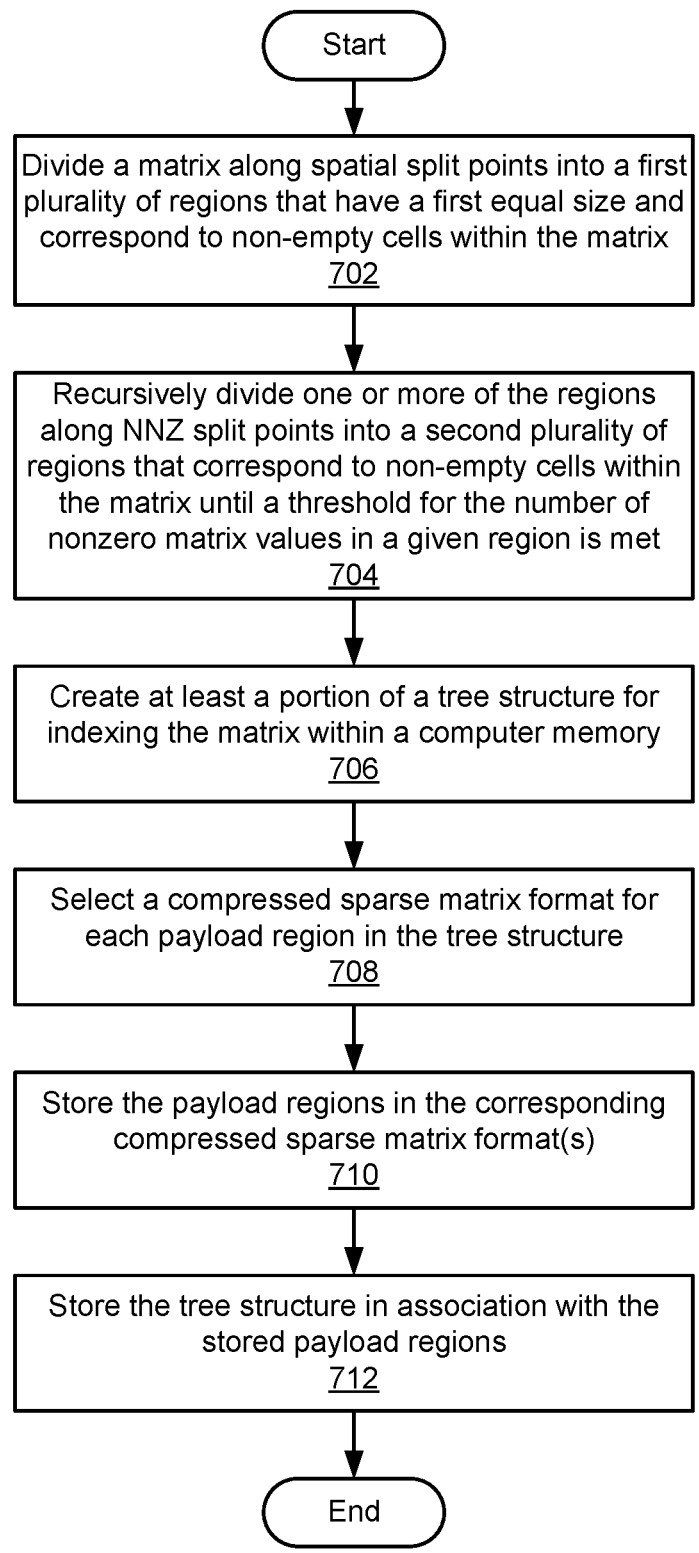
FIG. 7 is a flow diagram of method steps for generating a tree structure representing a sparse matrix, according to various embodiments.

FIG. 7 is a flow diagram of method steps for creating a tree structure representing a sparse matrix, according to various embodiments. Although the method steps are described in conjunction with the systems of FIGS. 1-3, persons skilled in the art will understand that any system configured to perform the method steps in any order falls within the scope of the present disclosure.

As shown, PPU 202 and/or another component divide 702 a matrix into a first plurality of regions that have an equal size and correspond to non-empty cells within the matrix. For example, the component could divide a 2D sparse matrix along horizontal and vertical spatial split points into a grid of equally sized regions, where each region has dimensions that meet a threshold for region size.

In some embodiments, the matrix stores interactions between a set of users and a set of items. In these embodiments, rows in the matrix may represent the set of users, and columns in the matrix may represent the set of items. Each element in the matrix may store values and/or counts associated with ratings, views, clicks, purchases, ignores, and/or other interactions between the user represented by the element's row and the item represented by the element's column.

Next, the component recursively divide 704 one or more of the regions formed in operation 702 along NNZ split points into a second plurality of regions that correspond to non-empty cells within the matrix until a threshold for the number of nonzero matrix values in a given region is met. For example, the component could compare the number of nonzero matrix values in each of the first plurality of regions to the threshold. If the number of nonzero matrix values in a given region meets or falls below the threshold, the component would omit further subdivision of the region. If the number of nonzero matrix values in a region does not meet the threshold, the component would divide region along one or more horizontal and/or vertical NNZ split points to form a greater number of regions that have substantially the same numbers of nonzero elements. These additional regions could optionally be further subdivided along corresponding NNZ split points until the number of nonzero elements in a given region meets or falls below the threshold for the number of nonzero elements in a region.

The component then creates 706 at least a portion of a tree structure for indexing the matrix within a computer memory. More specifically, the component generates a node within the tree structure for each region in the first and second pluralities of regions. When a given region in the matrix is divided into smaller nonempty regions, the component adds, to the tree structure, nodes representing the smaller regions as children of the node representing the region (e.g., by adding a directed edge from the node representing the region to a stage that includes the nodes representing the smaller regions). The component also groups nodes representing the first plurality of regions under additional layers of parent nodes representing larger regions in the matrix. For example, the component could group four nodes representing a 2×2 grid of equally sized regions formed in operation 702 under a parent node representing a larger region that spans the 2×2 grid. The component could also group four parent nodes representing four of these larger regions under a higher-level parent node representing an even larger region that spans all four of the larger regions. The component could continue grouping nodes at a certain level of the tree structure under parent nodes at a higher level of the tree structure to represent "merging" of regions in the matrix into larger regions until all nodes in the tree structure are descendants of a root node representing the matrix.

Thus, the tree structure includes the root node representing the matrix and one or more levels of child nodes below the root node that represent the subdivision of the matrix along spatial split points into one or more levels of equally sized regions. The tree structure also includes one or more additional levels of child nodes below at least a portion of the child nodes representing the smallest regions formed along spatial split points. These additional levels of child nodes represent additional subdivision of the smallest regions created along spatial split points into even smaller regions with substantially equal numbers of nonzero matrix values. Finally, the component generates leaf nodes within the tree structure representing payload regions that store nonzero elements in the matrix.

Traversal engine 122 and/or another component also select 708 a compressed sparse matrix format for each payload region in the tree structure. For example, the component could use a default compressed sparse matrix format such as CSR and/or CSC for all payload regions. In another example, the component could select the compressed sparse matrix format for a given payload region in a way that optimizes for the locations of nonzero matrix values in the payload region. After the compressed sparse matrix format is selected for a given payload region, traversal engine 122 and/or another component store 710 the payload region in the compressed sparse matrix format.

Finally, traversal engine 122 and/or another component store 712 the tree structure in association with the stored payload regions. For example, the component could store the tree structure and payload regions in the same and/or different regions of memory, persistent storage, cloud storage, and/or another type of storage. Within the tree structure, leaf nodes representing payload regions could include addresses, paths, and/or other types of locations of the payload regions. The tree structure could then be traversed to locate or access the nonzero elements in the payload regions and/or perform matrix operations on the nonzero elements, as described in further detail below.

Figure 8:
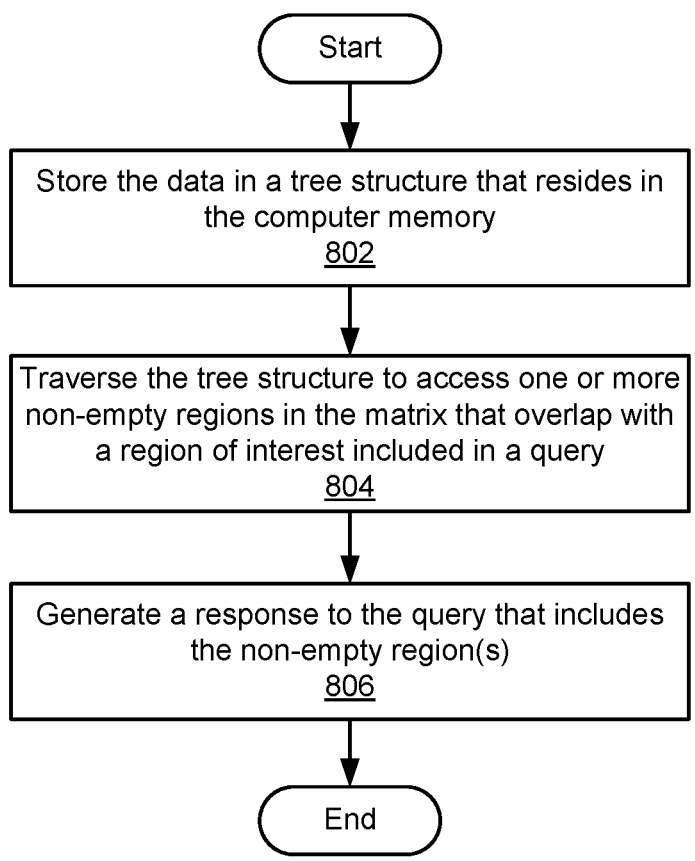
FIG. 8 is a flow diagram of method steps for using a tree structure to retrieve data stored within a computer memory, according to various embodiments.

FIG. 8 is a flow diagram of method steps for using a tree structure to retrieve data stored within a computer memory, according to various embodiments. Although the method steps are described in conjunction with the systems of FIGS. 1-3, persons skilled in the art will understand that any system configured to perform the method steps in any order falls within the scope of the present disclosure.

As shown, traversal engine 122 and/or another component store 802 the data in the tree structure that resides in the computer memory. For example, the component could store the tree structure in on-chip SRAM, off-chip DRAM, and/or another type of memory accessible to traversal engine 122. As described above, the tree structure may include a first plurality of nodes that correspond to a first plurality of non-empty regions in a matrix (e.g., a matrix of interactions between users and items). This first plurality of nodes includes a first node representing a first region and one or more second nodes that are children of the first node and represent one or more second regions that have an equal size and are formed within the first region. The tree structure may also include a second plurality of nodes that correspond to a second plurality of non-empty regions formed within at least one region included in the one or more second regions. This second plurality of nodes includes a third node representing a third region and one or more fourth nodes that are children of the third node and represent one or more fourth regions that have a substantially equal number of nonzero matrix values and are formed within the third region.

Next, traversal engine 122 traverses 804 the tree structure to access one or more non-empty regions in the matrix that overlap with a region of interest included in a query. Operation 804 is described in further detail below with respect to FIG. 9.

Traversal engine 122 then generates 806 a response to the query that includes the non-empty region(s). For example, traversal engine 122 could add the addresses of the non-empty region(s) to the response and/or add the nonzero matrix values included in the non-empty region(s) to the response. An accelerator and/or another component may then perform matrix multiplication and/or other types of matrix operations on the portions of the non-empty region(s) that overlap with the region of interest, as described in further detail below with respect to FIG. 10. The component may also, or instead, use the portions of the non-empty region(s) to generate a set of features and generate and/or output recommendations may be based on the set of features. For example, the component could use data in the response to retrieve interactions between users and items in a user-item matrix and input the interactions into a machine learning model, collaborative filtering technique, and/or another type of recommendation system. The recommendation system could then use the interactions and/or other features related to the users and/or items to generate additional recommendations of items to users.

Figure 9:
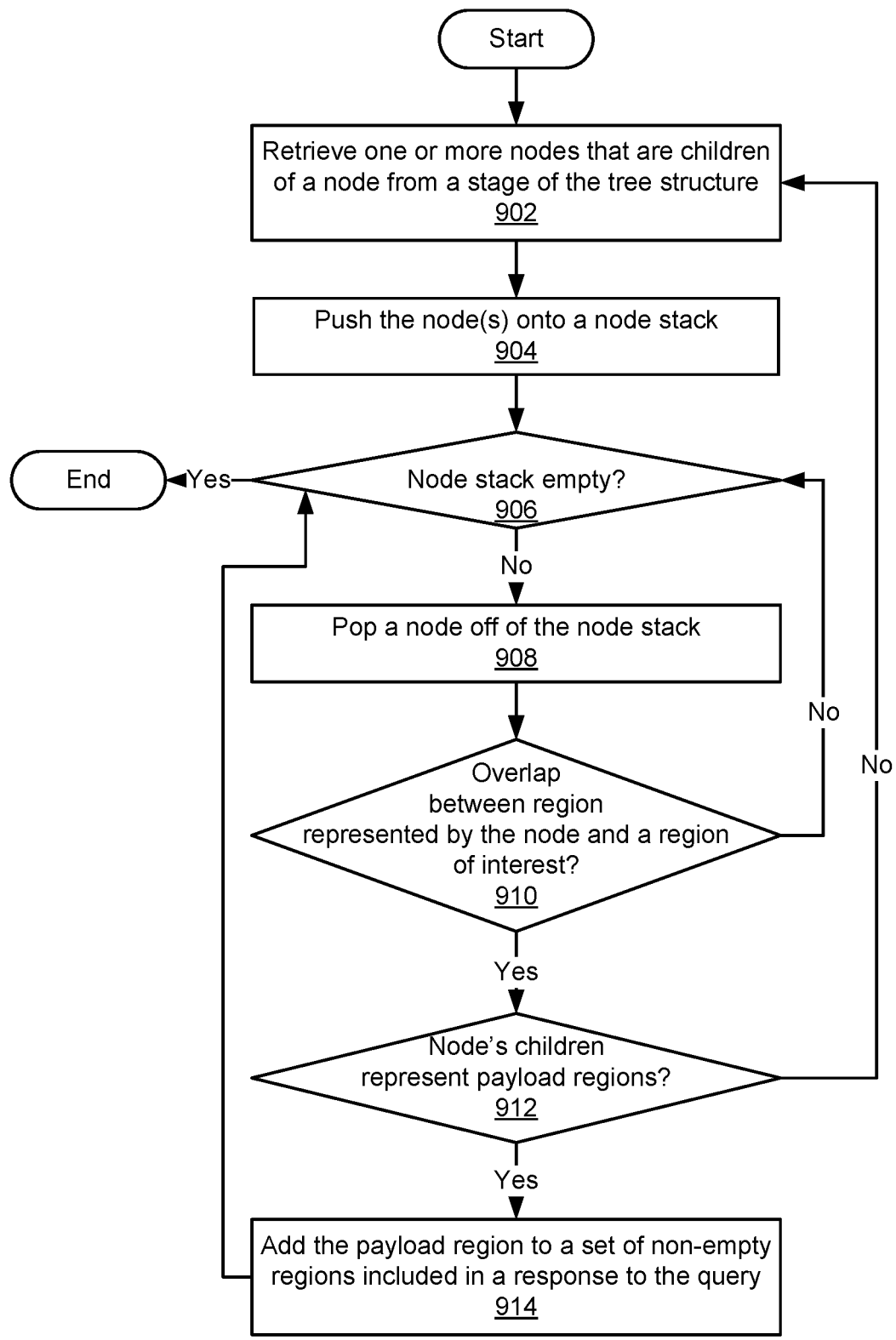
FIG. 9 is a flow diagram of method steps for traversing a tree structure to access one or more non-empty regions of a sparse matrix that overlap with a region of interest included in a query, according to various embodiments.

FIG. 9 is a flow diagram of method steps for traversing a tree structure to access non-empty regions in a matrix that overlap with a region of interest included in a query, according to various embodiments. Although the method steps are described in conjunction with the systems of FIGS. 1-3, persons skilled in the art will understand that any system configured to perform the method steps in any order falls within the scope of the present disclosure.

As shown, traversal engine 122 retrieves 902 one or more nodes that are children of a node from a stage of the tree structure and pushes 904 the node(s) onto a node stack. For example, traversal engine 122 could start at the root node of the tree structure and use one or more edges originating at the root node to obtain one or more nodes that are children of the root node. The root node would represent a matrix, and the children of the root node would represent one or more non-empty quadrants into which the sparse matrix is initially divided. The children of the root node would then be pushed onto the node stack in the order in which the children were retrieved.

Next, traversal engine 122 determines 906 whether or not the node stack is empty. If the node stack is empty, traversal engine 122 discontinues processing related to the query, since the lack of nodes in the node stack indicates a lack of non-empty regions in the matrix.

If the node stack is not empty, traversal engine 122 pops 908 a node off of the node stack and determines 910 whether or not the region represented by the node overlaps with a region of interest included in the query. For example, traversal engine 122 could obtain the boundaries of the region from metadata in the node. Traversal engine 122 could then perform one or more comparisons between an upper left corner of the region represented by the node with a lower right corner of the region of interest and/or an upper left corner of the region of interest with a lower right corner of the region represented by the node to determine the overlap or lack of overlap between the region and the region of interest.

If the region represented by the node does not overlap with the region of interest, traversal engine 122 does not perform any additional processing related to the node or the node's descendants in the tree structure. Instead, traversal engine 122 performs operation 906 to determine if the node stack is empty. If the node stack is empty, traversal engine 122 discontinues additional processing related to the query. If the node stack is not empty, traversal engine 122 performs operation 908 to retrieve the next node from the node stack.

If a region represented by a node retrieved from the node stack in operation 908 overlaps with the region of interest, traversal engine 122 determines 912 whether one or more children of the node represent payload regions. For example, traversal engine 122 could use a pointer from the node to the next stage representing the node's children in the tree structure to access metadata that identifies the "type" of node represented by the node's children. If the node type of the stage indicates that the node has a single child node representing a payload region in the tree structure, traversal engine 122 adds 914 the payload region to a set of non-empty regions included in a response to the query. For example, traversal engine 914 could retrieve the payload region's address from the child node and add the address to a list of addresses for non-empty regions to be returned in the response.

If one or more children of the node do not represent payload regions (e.g., because the node type of the corresponding stage is set to a different value), traversal engine 122 repeats operations 902-914 with the child node(s) of the node and/or additional sets of child nodes of other nodes in the node stack until the node stack is empty. In turn, the emptying of the node stack after a number of iterations of operations 902-914 indicates that traversal engine 122 has added all payload regions that overlap with the region of interest to the response.

Figure 10:
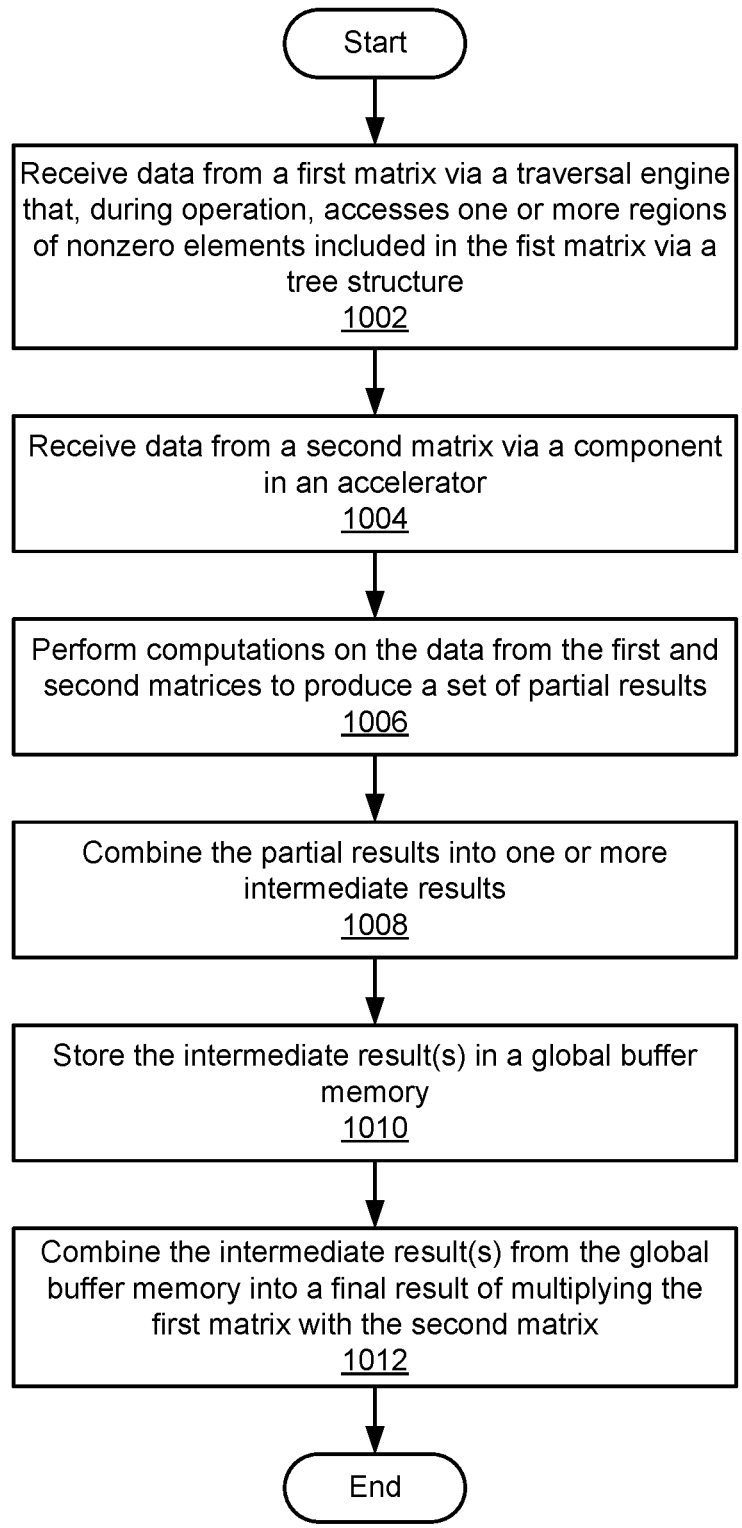
FIG. 10 is a flow diagram of method steps for performing matrix multiplication computations using a sparse matrix, according to various other embodiments.

FIG. 10 is a flow diagram of method steps for performing sparse matrix multiplication computations, according to various embodiments. Although the method steps are described in conjunction with the system of FIGS. 1-3 and 6, persons skilled in the art will understand that any system configured to perform the method steps in any order falls within the scope of the present disclosure.

As shown, PEs in grid 606 of accelerator 600 receive 1002 data from a first matrix via a traversal engine that, during operation, accesses one or more regions of nonzero elements included in the first matrix via a tree structure. For example, one or more components of accelerator 600 could transmit a query to traversal engine 122 for non-empty payload regions that overlap with a rectangular region of interest in the first matrix. Traversal engine 122 could process the query using the techniques described above and return, in response to the query, addresses of the overlapping non-empty payload regions and/or matrix values stored in the non-empty payload regions. The component(s) could then distribute different portions of the nonzero elements in the region of interest across the PEs.

The PEs in grid 606 also receive 1004 data from a second matrix via a component in accelerator 600. For example, the PEs could receive one or more columns (or portions of columns) in the second matrix from global buffer B 602 via B multicast 616. In another example, the PEs could receive one or more columns (or portions of columns) in the second matrix from a different traversal engine that accesses the column(s) by traversing a different tree structure representing the second matrix.

Next, the PEs perform 1006 computations on the data from the first and second matrices to produce a set of partial results. For example, each PE could include a first scratchpad that stores a portion of the first matrix received in operation 1002 and a second scratchpad that stores a portion of the second matrix received in operation 1004. Each PE could also include a multiplication array that computes a partial matrix multiplication result using the portions stored in the two scratchpads.

Merger 608 component then combines 1008 the partial results into one or more intermediate results and stores 1010 the intermediate result(s) in a global buffer memory. For example, merger 608 component could sum and/or otherwise aggregate the partial results into the intermediate result(s) and transmit the intermediate result(s) to global buffer C 604 for storage.

Finally, one or more components of accelerator 600 combine 1012 the intermediate result(s) from the global buffer memory into a final result of multiplying the first matrix with the second matrix. For example, the component(s) may arrange, aggregate, and/or otherwise process the intermediate result(s) so that an output matrix is available for use as the product of the first and second matrices.

In sum, the disclosed techniques provide a tree structure that can be used to efficiently store and access regions of nonzero elements in a sparse matrix (or another type of sparse data structure). The sparse matrix is recursively divided into equally sized regions that include nonzero elements until a threshold for region size is met. Individual regions that meet the threshold for region size can be further subdivided along split points that separate the regions into multiple regions with substantially equal numbers of nonzero elements until the number of nonzero elements in a given region falls below a threshold.

The tree structure is created to index the subdivided regions and nonzero elements in the sparse matrix. The root node of the tree represents the entire sparse matrix, and child nodes below the root node represent regions of nonzero values into which the sparse matrix is divided. Additional layers of nodes can be added as children of a node to represent multiple regions into which a region represented by the node is divided. When a region that includes nonzero elements in the sparse matrix is not further subdivided, a "payload region" that stores nonzero elements in the region is represented in the tree structure as a child node of a node representing the region. The tree structure thus provides a compressed format for storing the sparse matrix.

The tree structure can then be loaded into a CPU, a GPU, a specialized accelerator that implements a tree-traversal engine, and/or another type of processor. The processor uses the tree structure to process queries of specific "regions of interest" in the sparse matrix (e.g., regions to be used to perform matrix multiplication and other matrix processing operations) and returns, in response to each query, any payload regions represented by leaf nodes in the tree structure that overlap with a corresponding region of interest. A CPU, GPU, accelerator, and/or another type of processor can then use the data in the response to perform matrix multiplication and/or other types of matrix operations using the matrix values in the region of interest.

One technical advantage of the disclosed techniques relative to the prior art is that regions of a sparse matrix having similar numbers of nonzero matrix element values can be distributed across multiple processing elements within a parallel processor when performing matrix multiplication operations or matrix operations to achieve more balanced work distributions across those processing elements. Another technical advantage of the disclosed techniques is that the amount of data accessed from another matrix when multiplying the regions of a sparse matrix containing nonzero matrix element values with regions of the other matrix is reduced. An additional technical advantage of the disclosed techniques is that a tree structure that does not include nodes representing empty regions of a sparse matrix can be traversed to access arbitrary regions, dimensions, or matrix elements of the sparse matrix more efficiently relative to prior art techniques. These technical advantages provide one or more technological improvements over prior art approaches.

1. In some embodiments, a computer-implemented method for generating a tree structure within a computer memory for storing sparse data comprises dividing a matrix that stores interactions between a set of users and a set of items into a first plurality of regions that have a first equal size and correspond to non-empty cells within the matrix, dividing at least one region included in the first plurality of regions into a second plurality of regions corresponding to non-empty cells within the matrix, wherein the second plurality of regions includes a first region and one or more second regions that have a substantially equal number of nonzero matrix values and are formed within the first region, and creating at least a portion of the tree structure within the computer memory by generating a first plurality of nodes within the tree structure that represent the first plurality of regions, generating a second plurality of nodes within the tree structure that represent the second plurality of regions, grouping, under a first node that represents the first region and is included in the second plurality of nodes, one or more second nodes that represent the one or more second regions, and grouping the first plurality of nodes under a third plurality of nodes within the tree structure, wherein the third plurality of nodes represent a third plurality of regions that have a second equal size that is larger than the first equal size.

2. The computer-implemented method of clause 1, wherein the matrix comprises a set of rows representing the set of users and a set of columns representing the set of items.

3. The computer-implemented method of clauses 1 or 2, wherein the interactions comprise at least one of a rating, a view, a click, an ignore, or a purchase.

4. In some embodiments, a computer-implemented method for generating a tree structure within a computer memory for storing sparse data comprises dividing a matrix into a first plurality of regions that have a first equal size and correspond to non-empty cells within the matrix, dividing at least one region included in the first plurality of regions into a second plurality of regions corresponding to non-empty cells within the matrix, wherein the second plurality of regions includes a first region and one or more second regions that have a substantially equal number of nonzero matrix values and are formed within the first region, and creating at least a portion of the tree structure within the computer memory by generating a first plurality of nodes within the tree structure that represent the first plurality of regions, generating a second plurality of nodes within the tree structure that represent the second plurality of regions, and grouping, under a first node that represents the first region and is included in the second plurality of nodes, one or more second nodes that represent the one or more second regions.

5. The computer-implemented method of clause 4, further comprising generating one or more third nodes within the tree structure that are children of the one or more second nodes and represent one or more payload regions that store the nonzero matrix values within the one or more second regions.

6. The computer-implemented method of clauses 4 or 5, wherein grouping the one or more second nodes under the first node comprises adding to the tree structure a directed edge from the first node to a stage that includes the one or more second nodes.

7. The computer-implemented method of any of clauses 4-6, further comprising storing a payload region included in the one or more second regions in a compressed sparse matrix format.

8. The computer-implemented method of any of clauses 4-7, further comprising selecting the compressed sparse matrix format based on one or more locations of one or more nonzero matrix values in the payload region.

9. The computer-implemented method of any of clauses 4-8, further comprising grouping the first plurality of nodes under a third plurality of nodes within the tree structure, wherein the third plurality of nodes represents a third plurality of regions that have a second equal size that is larger than the first equal size.

10. The computer-implemented method of any of clauses 4-9, further comprising grouping the third plurality of nodes under a root node representing the matrix.

11. The computer-implemented method of any of clauses 4-10, wherein grouping the first plurality of nodes under the third plurality of nodes comprises adding to the tree structure a directed edge from a third node representing a third region included in the third plurality of regions to one or more fourth nodes representing one or more fourth regions included in the first plurality of regions, wherein the one or more fourth regions correspond to one or more quadrants within the third node.

12. The computer-implemented method of any of clauses 4-11, wherein dividing the at least one region included in the first plurality of regions into the second plurality of regions comprises dividing the at least one region into two or more regions with substantially equal numbers of nonzero matrix values, wherein the two or more regions include the first region, and dividing the first region into the one or more second regions.

13. The computer-implemented method of any of clauses 4-12, wherein dividing the first region into the one or more second regions comprises recursively dividing the first region into the one or more second regions until a threshold for a number of nonzero matrix values in a given region is met.

14. In some embodiments, one or more non-transitory computer readable media store instructions that, when executed by one or more processors, cause the one or more processors to perform the steps of dividing a matrix into a first plurality of regions that have a first equal size and correspond to non-empty cells within the matrix, dividing at least one region included in the first plurality of regions into a second plurality of regions corresponding to non-empty cells within the matrix, wherein the second plurality of regions includes a first region and one or more second regions that have a substantially equal number of nonzero matrix values and are formed within the first region, and creating at least a portion of a tree structure for indexing the matrix within a computer memory by generating a first plurality of nodes within the tree structure that represent the first plurality of regions, generating a second plurality of nodes within the tree structure that represent the second plurality of regions, and grouping, under a first node that represents the first region and is included in the second plurality of nodes, one or more second nodes that represent the one or more second regions.

15. The one or more non-transitory computer readable media of clause 14, wherein the instructions further cause the one or more processors to perform the step of generating one or more third nodes within the tree structure that are children of the one or more second nodes and represent one or more payload regions that store the nonzero matrix values within the one or more second regions.

16. The one or more non-transitory computer readable media of clauses 14 or 15, wherein the instructions further cause the one or more processors to perform the step of storing the tree structure in association with a plurality of payload regions that store the nonzero matrix values included in the matrix.

17. The one or more non-transitory computer readable media of any of clauses 14-16, wherein generating the first plurality of nodes within the tree structure comprises storing the first plurality of nodes in association with an indication that the first plurality of nodes represents regions of equal size and one or more boundaries of the first plurality of regions.

18. The one or more non-transitory computer readable media of any of clauses 14-17, wherein generating the second plurality of nodes within the tree structure comprises storing the one or more second nodes in association with one or more split points along which the first region is divided to form the one or more second regions.

19. The one or more non-transitory computer readable media of any of clauses 14-18, wherein the instructions further cause the one or more processors to perform the step of grouping the first plurality of nodes under a third plurality of nodes within the tree structure, wherein the third plurality of nodes represents a third plurality of regions that have a second equal size that is larger than the first equal size.

20. The one or more non-transitory computer readable media of any of clauses 14-19, wherein dividing the at least one region included in the first plurality of regions into the second plurality of regions comprises dividing the at least one region into two or more regions with substantially equal numbers of nonzero matrix values, wherein the two or more regions include the first region, and dividing the first region into the one or more second regions. Any and all combinations of any of the claim elements recited in any of the claims and/or any elements described in this application, in any fashion, fall within the contemplated scope of the present invention and protection.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a tree structure within a computer memory for storing sparse data, the method comprising:
    dividing a matrix that stores interactions between a set of users and a set of items into a first plurality of regions that have a first equal size and correspond to non-empty cells within the matrix;
    dividing at least one region included in the first plurality of regions into a second plurality of regions corresponding to non-empty cells within the matrix, wherein the second plurality of regions includes a first region and one or more second regions that have nonzero matrix values and are formed within the first region; and
    creating at least a portion of the tree structure within the computer memory by:
        generating a first plurality of nodes within the tree structure that represent the first plurality of regions,
        generating a second plurality of nodes within the tree structure that represent the second plurality of regions,
        grouping, under a first node that represents the first region and is included in the second plurality of nodes, one or more second nodes that represent the one or more second regions, and
        grouping the first plurality of nodes under a third plurality of nodes within the tree structure, wherein the third plurality of nodes represent a third plurality of regions that have a second equal size that is larger than the first equal size.

2. The computer-implemented method of claim 1, wherein the matrix comprises a set of rows representing the set of users and a set of columns representing the set of items.

3. The computer-implemented method of claim 1, wherein the interactions comprise at least one of a rating, a view, a click, an ignore, or a purchase.

4. A computer-implemented method for generating a tree structure within a computer memory for storing sparse data, the method comprising:
    dividing a matrix into a first plurality of regions that have a first equal size and correspond to non-empty cells within the matrix;
    dividing at least one region included in the first plurality of regions into a second plurality of regions corresponding to non-empty cells within the matrix, wherein the second plurality of regions includes a first region and one or more second regions that have nonzero matrix values and are formed within the first region; and
    creating at least a portion of the tree structure within the computer memory by:
        generating a first plurality of nodes within the tree structure that represent the first plurality of regions,
        generating a second plurality of nodes within the tree structure that represent the second plurality of regions, and
        grouping, under a first node that represents the first region and is included in the second plurality of nodes, one or more second nodes that represent the one or more second regions.

5. The computer-implemented method of claim 4, further comprising generating one or more third nodes within the tree structure that are children of the one or more second nodes and represent one or more payload regions that store the nonzero matrix values within the one or more second regions.

6. The computer-implemented method of claim 4, wherein grouping the one or more second nodes under the first node comprises adding to the tree structure a directed edge from the first node to a stage that includes the one or more second nodes.

7. The computer-implemented method of claim 4, further comprising storing a payload region included in the one or more second regions in a compressed sparse matrix format.

8. The computer-implemented method of claim 7, further comprising selecting the compressed sparse matrix format based on one or more locations of one or more nonzero matrix values in the payload region.

9. The computer-implemented method of claim 4, further comprising grouping the first plurality of nodes under a third plurality of nodes within the tree structure, wherein the third plurality of nodes represents a third plurality of regions that have a second equal size that is larger than the first equal size.

10. The computer-implemented method of claim 9, further comprising grouping the third plurality of nodes under a root node representing the matrix.

11. The computer-implemented method of claim 9, wherein grouping the first plurality of nodes under the third plurality of nodes comprises adding to the tree structure a directed edge from a third node representing a third region included in the third plurality of regions to one or more fourth nodes representing one or more fourth regions included in the first plurality of regions, wherein the one or more fourth regions correspond to one or more quadrants within the third node.

12. The computer-implemented method of claim 4, wherein dividing the at least one region included in the first plurality of regions into the second plurality of regions comprises:
    dividing the at least one region into two or more regions with nonzero matrix values, wherein the two or more regions include the first region; and
    dividing the first region into the one or more second regions.

13. The computer-implemented method of claim 12, wherein dividing the first region into the one or more second regions comprises recursively dividing the first region into the one or more second regions until a threshold for a number of nonzero matrix values in a given region is met.

14. One or more non-transitory computer readable media storing instructions that, when executed by one or more processors, cause the one or more processors to perform the steps of:

dividing a matrix into a first plurality of regions that have a first equal size and correspond to non-empty cells within the matrix;

dividing at least one region included in the first plurality of regions into a second plurality of regions corresponding to non-empty cells within the matrix, wherein the second plurality of regions includes a first region and one or more second regions that have nonzero matrix values and are formed within the first region; and creating at least a portion of a tree structure for indexing the matrix within a computer memory by:

generating a first plurality of nodes within the tree structure that represent the first plurality of regions, generating a second plurality of nodes within the tree structure that represent the second plurality of regions, and grouping, under a first node that represents the first region and is included in the second plurality of nodes, one or more second nodes that represent the one or more second regions.

15. The one or more non-transitory computer readable media of claim 14, wherein the instructions further cause the one or more processors to perform the step of generating one or more third nodes within the tree structure that are children of the one or more second nodes and represent one or more payload regions that store the nonzero matrix values within the one or more second regions.

16. The one or more non-transitory computer readable media of claim 14, wherein the instructions further cause the one or more processors to perform the step of storing the tree structure in association with a plurality of payload regions that store the nonzero matrix values included in the matrix.

17. The one or more non-transitory computer readable media of claim 14, wherein generating the first plurality of nodes within the tree structure comprises storing the first plurality of nodes in association with an indication that the first plurality of nodes represents regions of equal size and one or more boundaries of the first plurality of regions.

18. The one or more non-transitory computer readable media of claim 14, wherein generating the second plurality of nodes within the tree structure comprises storing the one or more second nodes in association with one or more split points along which the first region is divided to form the one or more second regions.

19. The one or more non-transitory computer readable media of claim 14, wherein the instructions further cause the one or more processors to perform the step of grouping the first plurality of nodes under a third plurality of nodes within the tree structure, wherein the third plurality of nodes represents a third plurality of regions that have a second equal size that is larger than the first equal size.

20. The one or more non-transitory computer readable media of claim 14, wherein dividing the at least one region included in the first plurality of regions into the second plurality of regions comprises:

dividing the at least one region into two or more regions with nonzero matrix values, wherein the two or more regions include the first region; and dividing the first region into the one or more second regions.

\* \* \* \* \*